US012810431B2

(12) United States Patent
Lee

(10) Patent No.: US 12,810,431 B2
(45) Date of Patent: Nov. 24, 2026

(54) METHOD AND SYSTEM FOR AUXILIARY MEDICAL DIAGNOSIS FOR GASTRITIS

(71) Applicants: National Taiwan University Hospital, Taipei City (TW); National Taiwan University, Taipei City (TW)

(72) Inventor: Yi-Chia Lee, Taipei City (TW)

(73) Assignees: NATIONAL TAIWAN UNIVERSITY HOSPITAL, Taipei City (TW); NATIONAL TAIWAN UNIVERSITY, Taipei City (TW)

( * ) Notice: Subject to any disclaimer, the term of this patent is extended or adjusted under 35 U.S.C. 154(b) by 291 days.

(21) Appl. No.: 18/654,621

(22) Filed: May 3, 2024

(65) Prior Publication Data

US 2024/0420330 A1 Dec. 19, 2024

Related U.S. Application Data

(60) Provisional application No. 63/521,393, filed on Jun. 16, 2023.

(30) Foreign Application Priority Data

Apr. 2, 2024 (TW) ................................ 113109840

(51) Int. Cl.
*G06T 7/13* (2017.01)
*G06T 7/00* (2017.01)

(52) U.S. Cl.
CPC .............. *G06T 7/0014* (2013.01); *G06T 7/13* (2017.01); *G06T 2207/10068* (2013.01);
(Continued)

(58) Field of Classification Search
CPC ..................... G06T 7/0014; G06T 7/13; G06T 2207/10068; G06T 2207/20081;
(Continued)

(56) References Cited

U.S. PATENT DOCUMENTS

2017/0231550 A1* 8/2017 Do ........................ G06T 7/0012 382/128
2023/0045882 A1 2/2023 Yamamoto
2024/0037733 A1* 2/2024 Bang ...................... G06V 10/82

FOREIGN PATENT DOCUMENTS

CN 114782760 A 7/2022
EP 3876192 A1 9/2021

OTHER PUBLICATIONS

"Farah Mohammad et al., Deep Feature Fusion and Optimization-Based Approach for Stomach Disease Classification Sep. 2022, MDPI pp. 1-17" (Year: 2022).*

(Continued)

*Primary Examiner* — Andrew W Bee
*Assistant Examiner* — D J Dhooge
(74) *Attorney, Agent, or Firm* — WPAT, PC

(57) ABSTRACT

Provided are a method and a system for Medical auxiliary diagnostic for gastritis. The medical auxiliary diagnostic system includes: a sampling system collecting and storing medical images, and including a first dataset and a second dataset; a user device connected to the sampling system, and reading medical images from the sampling system or uploading medical images; and an image analysis system connected to both the sampling system and the user device to analyze medical images based on requests from the user device, thereby generating auxiliary images for assisting in diagnosis. The image analysis system performs deep learning based on the first dataset and the second dataset. Based on the results of the deep learning, the image analysis system performs inferences on a target image to generate auxiliary diagnostic images for assisting in identifying precancerous lesions. Both the first and second datasets include upper gastrointestinal endoscopic images.

12 Claims, 8 Drawing Sheets

(52) U.S. Cl.
CPC ............... *G06T 2207/20081* (2013.01); *G06T 2207/20084* (2013.01); *G06T 2207/20132* (2013.01); *G06T 2207/30092* (2013.01); *G06T 2207/30096* (2013.01)

(58) Field of Classification Search
CPC . G06T 2207/20084; G06T 2207/20132; G06T 2207/30092; G06T 2207/30096; G06T 7/0012
See application file for complete search history.

(56) References Cited

OTHER PUBLICATIONS

"Chih-Chung Hsu, SSSNet: Small-Scale-Aware Siamese Network for Gastric Cancer Detection, National Pingtung University of Science and Technology No. 1, 2021, NPUST, pp. 1-5" (Year: 2021).*
"Hyun-sik Ham et al., Improvement of Gastroscopy Classification Performance Through Image Augmentation Using a Gradient-Weighted Class Activation Map, edition 10 2022, IEEE, pp. 99361-99369" (Year: 2022).*
Yi-Chia Lee et al. "Evaluation of the gastric cancer risk with upper endoscopic images: A cloud-computing telemedicine service based on the artificial intelligence", May 7-9, 2023, Digestive Disease Week 2023.

* cited by examiner

METHOD AND SYSTEM FOR AUXILIARY MEDICAL DIAGNOSIS FOR GASTRITIS

CROSS-REFERENCE TO RELATED APPLICATION

The application claims the priority of U.S. provisional application No. 63/521,393, filed on Jun. 16, 2023, and also the priority of Taiwan patent application No. 113109840, filed on Apr. 2, 2024, which are incorporated herewith by reference.

BACKGROUND OF THE INVENTION

1. Field of the Invention

The present invention relates to medical image recognition technology, particularly to a system and method for diagnosing precancerous lesions of gastric cancer and *Helicobacter pylori* infection using artificial intelligence.

2. The Prior Arts

Gastric cancer is a major global health problem. According to statistics from 2020, there were over 1 million new cases and approximately 769,000 deaths. In terms of incidence rate, gastric cancer is listed as the fifth most common cancer and the fourth leading cause of cancer deaths worldwide. The main cause of gastric cancer is *Helicobacter pylori* infection, which can be prevented through short-term antibiotic treatment. However, even after successful eradication of the infection, individuals may still develop precancerous lesions, such as atrophic gastritis and intestinal metaplasia. Therefore, patients require continuous endoscopic monitoring to enable early detection and treatment. Generally, histological assessment is recognized as one of the most effective methods for diagnosing precancerous lesions of gastric cancer and *Helicobacter pylori* infection, allowing for risk stratification of gastric cancer. However, the bottleneck of this method lies in its time-consuming nature, requirement for expertise, and uncertainty regarding the ideal number and location of biopsy samples.

Statistics indicate that Matsu, situated near Taiwan, is a high-risk region for gastric cancer. In an effort to mitigate the threat of gastric cancer for local residents, relevant authorities have implemented a large-scale *Helicobacter pylori* eradication program over the past two decades. While this program has resulted in a significant reduction of approximately 50% in gastric cancer incidence, sporadic cases of the disease continue to emerge in the area. It is widely acknowledged that further stratification of the population based on individual risk profiles may yield more effective disease prevention and treatment outcomes. Consequently, the development of a medical auxiliary system that harnesses modern computer computing technology is warranted.

SUMMARY OF THE INVENTION

In view of the issues set forth, the present invention proposes a medical auxiliary diagnostic system based on artificial intelligence (AI) to assist frontline doctors in diagnosing precancerous gastric lesions and *Helicobacter pylori* infections in the real world.

In one embodiment, a medical auxiliary diagnostic system comprises a sampling system, a user device, and an image analysis system. The sampling system is arranged to collect and store medical images, which comprise a first dataset and a second dataset. The user device is connected to the sampling system and is configured to read medical images from the sampling system or upload medical images. The image analysis system is connected to the sampling system and the user device, and is configured to analyze medical images according to the user device's requirements, thereby generating an auxiliary diagnostic image to assist in diagnosis. The image analysis system reads the first dataset and the second dataset from the sampling system to perform deep learning. Based on the results of the deep learning, the image analysis system infers a target image provided by the image analysis system to generate an auxiliary diagnostic image that can assist in identifying precancerous lesions and *Helicobacter pylori* infections. The first dataset comes from a non-specific region and has an average incidence rate. The second dataset comes from a specific region and has an incidence rate higher than the average incidence rate. The first dataset and the second dataset comprise upper gastrointestinal endoscopy images.

In one embodiment, the image analysis system comprises a training module, a first model, a second model, and a third model. The training module performs deep learning based on the first dataset and the second dataset. The first model, trained by the training module, can be used to identify gastric regions and non-gastric regions in a sample image. The second model, trained by the training module, can further classify the identified gastric regions in the sample image into stomach antrum, stomach body, and stomach fundus. The third model, trained by the training module, can determine whether a precancerous lesion or *Helicobacter pylori* infection exists in the stomach antrum and stomach body of the sample image. The sample image is an upper gastrointestinal endoscopy image from the first dataset or the second dataset. The precancerous lesion comprises atrophic gastritis or intestinal metaplasia.

Furthermore, the image analysis system may comprise a preprocessing module, arranged to preprocess an input image to generate a normalized image. When the preprocessing module preprocesses the input image, it converts the input image into a grayscale image and utilizes the Otsu thresholding method to convert the grayscale image into a binary map. The preprocessing module performs edge detection on the binary map to identify a target region in the input image, and crops the input image to obtain a cropped image that only retains the target region. The preprocessing module then resizes the cropped image to a preset dimension, generating a normalized image corresponding to the input image. The training module normalizes the images in the first dataset and the second dataset using the preprocessing module before performing deep learning on the first dataset and the second dataset.

Furthermore, when the preprocessing module preprocesses the input image, the preprocessing module may perform a Contrast Limited Adaptive Histogram Equalization (CLAHE) operation on the input image to enhance image details and highlight gastric mucosa features.

In a further embodiment, the image analysis system comprises an inference module, arranged to utilize the first model, the second model, and the third model to infer the target image and determine the risk of gastric cancer. The inference module utilizes the first model to identify gastric regions and non-gastric regions in the target image. The inference module utilizes the second model to further classify the identified gastric regions in the target image into stomach antrum, stomach body, and stomach fundus. The inference module utilizes the third model to determine whether a precancerous lesion exists in the stomach antrum and stomach body of the target image. Finally, the inference module performs a Gradient-weighted Class Activation Mapping (Grad-CAM) operation to overlay a visual effect on the target image based on the disease probability, thereby generating the auxiliary diagnostic image. The target image is an upper gastrointestinal endoscopy image collected and stored by the sampling system, and provided to the image analysis system through the user device for the inference module to perform analysis. The inference module may further normalize the target image through the preprocessing module before performing analysis.

In another embodiment, the first model can be trained using DenseNet201 as the template model, and fine-tuned by the training module. When the training module trains the first model, it reads the first dataset and the second dataset from the sampling system, and allocates 70% of them as a training set, 20% as a validation set, and 10% as a testing set.

In another embodiment, the second model is trained using DenseNet121 as the template model, and fine-tuned by the training module, and comprises a feature extraction module and a classification module. The feature extraction module comprises multiple layers of convolutional neural networks, and configured to extract a feature map from the input data through convolutional operations. The classification module comprises one or more fully connected layers, coupled to the output end of the feature extraction module, and configured to calculate the probability values of the input data belonging to the stomach fundus, stomach antrum, or stomach body based on the feature map generated by the feature extraction module. When the training module trains the second model, it reads the first dataset and the second dataset from the sampling system, and allocates 80% of the first dataset as a training set, 20% as a validation set, and 10% of the second dataset as a testing set. Finally, the classification module uses the SoftMax activation function to calculate the probability values of the input data belonging to the stomach fundus, the stomach antrum, or the stomach body.

In another embodiment, the third model is trained using a Vision Transformer as the template model, fine-tuned by the training module. The Vision Transformer comprises a translation patching layer that can translate an input image along four diagonal lines to generate four shifted images, and then stack them with the input image to form a shifted stack image. An image segmentation layer is coupled to the translation patching layer, cutting the shifted stack image into multiple patches, flattening them into a one-dimensional sequence, where each patch corresponds to a fixed-length feature vector. A positional embedding layer is coupled to the image segmentation layer, receiving the output of the image segmentation layer and adding positional information to each patch. A multi-layer encoder is coupled to the positional embedding layer, performing self-attention operations between the input patches to extract a feature vector matrix corresponding to the input image. A multi-layer perceptron is coupled to the multi-layer encoder, including multiple fully connected layers, and configured to pool the feature vector matrix to obtain a probability distribution matrix representing the entire input image. The multi-layer encoder also performs local self-attention operations between each patch and its neighboring patches, emphasizing local relevance in the feature vector matrix. The multi-layer perceptron uses a Sigmoid activation function to calculate the probability distribution matrix, where each element of the matrix represents a severity level of a pathology.

In another embodiment, the present invention proposes a method for auxiliary diagnosis of gastritis. First, a first dataset and a second dataset are provided, where the first dataset and the second dataset comprise upper gastrointestinal endoscopy images. The method preprocesses the images in the first dataset and the second dataset, and then performs deep learning on the first dataset and the second dataset. Finally, based on the results of the deep learning, the method infers a target image to generate an auxiliary image, and the auxiliary image is thereafter used to assist in identifying whether the target image contains a precancerous lesion or *Helicobacter pylori* infection. The first dataset comes from a non-specific region and has an average incidence rate. The second dataset comes from a specific region and has an incidence rate higher than the average incidence rate.

In summary, the medical image analysis system proposed by the present invention is characterized by its ability to perform pathological recognition on endoscopy images, generate lesion heatmaps, and assist experts in improving diagnostic accuracy, reducing misdiagnosis rates, and optimizing the allocation of subsequent treatment resources.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE PREFERRED EMBODIMENT

The following embodiments of the present invention are illustrated by specific examples, those skilled in the art may easily understand other advantages and efficacy of the present invention from the content disclosed in this specification. The present invention may also be implemented or applied by different specific embodiments, the details of the present specification may also be based on different views and applications, without departing from the spirit of the present invention to conduct various modifications or changes.

The following description will combine the diagrams in the embodiments of the present invention to provide a clear and complete description of the technical solutions in the embodiments of the present invention. It is obvious that the described embodiments are only part of the embodiments of the present invention, and not all of the embodiments. Based on the embodiments of the present invention, all other embodiments that can be obtained by a person of ordinary skill in the art without creative effort are within the scope of protection of the present invention.

Atrophic gastritis and intestinal metaplasia are histological symptoms related to gastric cancer risk, also known as precancerous lesions. The embodiments of the present invention provide a medical auxiliary diagnosis system 100, which analyzes regular endoscopy images to assist experts in diagnosing gastric precancerous lesions. The following description will explain the fundamental architecture of the embodiments of the present invention with reference to FIG. 1.

Figure 1:
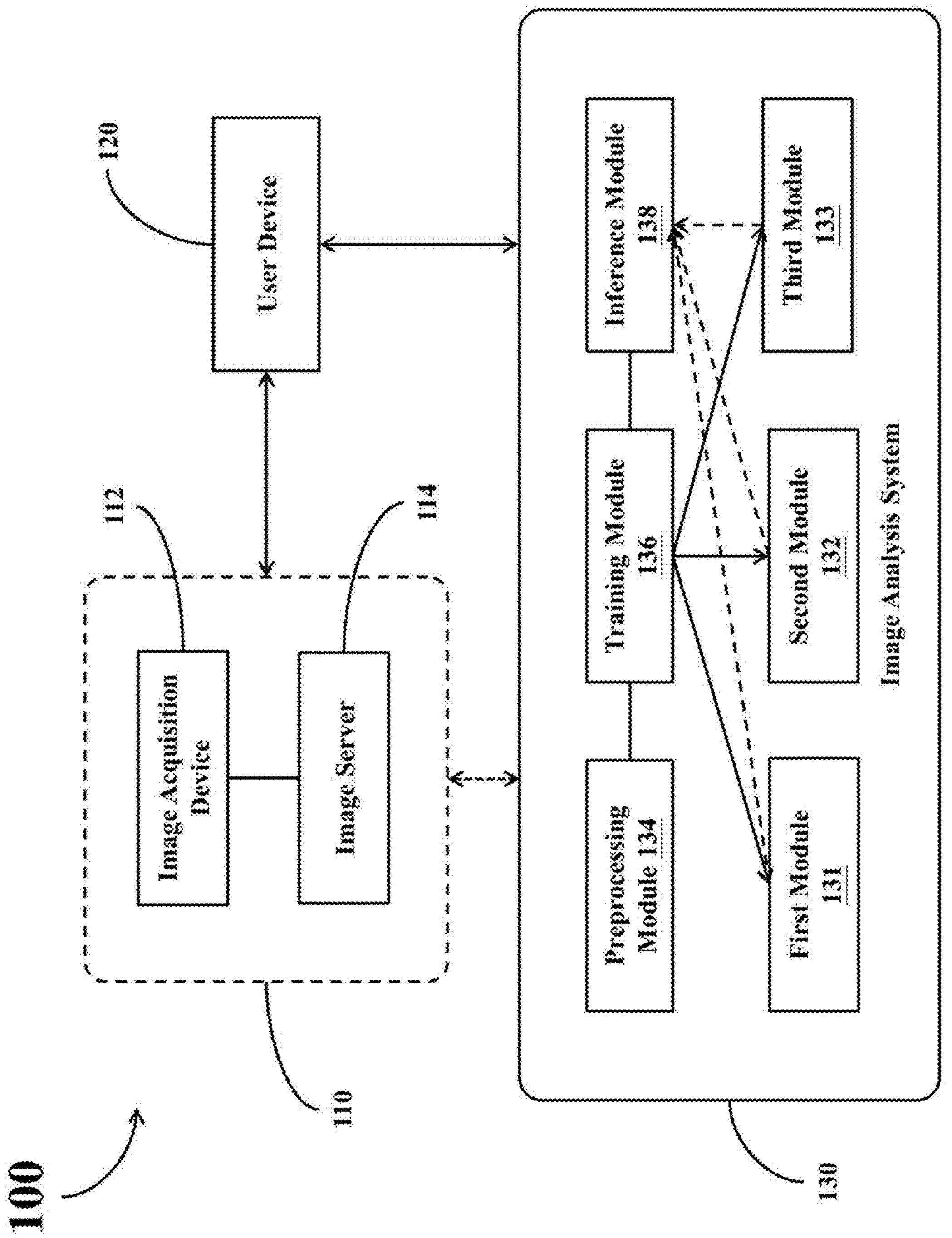
FIG. 1 shows a medical auxiliary diagnosis system according to an embodiment of the present invention.

FIG. 1 is a medical auxiliary diagnosis system 100 of the present invention, which may be able to input histological analysis results into an artificial intelligence algorithm to generate visual images that may be able to assist in diagnosing gastric precancerous lesions.

In the medical auxiliary diagnosis system 100 of the present invention, two types of datasets with different attributes are used. The first dataset is from a large medical center with a national average incidence rate, and the second dataset is from a specific regional hospital with a high incidence rate. The specific content of the data referred to in the present invention comprise endoscopy images of the stomach. These endoscopy images are processed through certain preprocessing and deep learning algorithms, simulating the process of human experts performing endoscopy and histological evaluation. The medical auxiliary diagnosis system 100 of the present invention may be applicable in specific hospitals with high incidence rates, assisting in the implementation of end-to-end remote medical services. The medical auxiliary diagnosis system 100 of the present invention has been certified for having robust predictive capability in practice and has been registered on ClinicalTrials.gov as NCT05762991.

The medical auxiliary diagnosis system 100 of the present invention adopts an artificial intelligence model to assist in recognizing endoscopy images of stomach. The training process of the artificial intelligence model involved in the present invention roughly comprises the following steps. Data collection: Collecting data for training the model, which may be in the form of images, text, audio, etc., depending on the problem to be solved by the model. Data preprocessing: Performing data cleaning, standardization (normalization), feature extraction, and other preprocessing operations on the collected data to ensure the quality and applicability of the data. Data splitting: Dividing the data into training sets, validation sets, and testing sets. The training set is used to train the model, the validation set is used to adjust the model's hyperparameters and evaluate the model's performance, and the testing set is used to finally evaluate the model's generalization ability. Template model selection: Selecting a template model suitable for solving the problem, such as deep neural networks, decision trees, support vector machines, etc. Model training: Using the training set data to train the model, and adjusting the model parameters through optimization algorithms (such as gradient descent) to minimize the loss function. Model validation: Evaluating the model's performance using the validation set data during the training process or at the end of each training cycle (epoch), to guide the direction of model training and adjust the model's hyperparameters. The validation set can help monitor whether the model is overfitting or underfitting, and adjust the model's hyperparameters based on the monitoring results. The validation results are usually not used directly for model parameter updates, but rather as a guiding evaluation to ensure that the model performs well on unseen data. Hyperparameter tuning: Optimizing the model's performance by trying different hyperparameter combinations, such as learning rates, batch sizes, and layer numbers. Model evaluation: Evaluating the model's performance using the testing set data after the model is trained, to determine the model's generalization ability and actual application effects. The testing set data usually adopts a dataset with known answers, facilitating comparison of the machine learning recognition results and statistical accuracy. Model deployment: Deploying the trained model to actual applications to solve real-world problems.

On data collection, the first dataset adopted by the medical auxiliary diagnosis system 100 of the present invention may come from the centralized research database of the National Taiwan University Hospital medical system. The database comprises data from ten hospitals located in Taiwan. To meet the requirements of real-world evidence, all electronic medical records from the hospitals, such as medical history, laboratory data, examination reports, pathological results, and medical images, have been anonymized and transmitted to a comprehensive medical database called NTUH-iMD since 2006. In the embodiment, the first dataset comprises patients' endoscopy images, as well as histological examination results of the stomach antrum, stomach body, and gastric mucosa, wherein the first dataset serves as the primary basis for model training in the medical auxiliary diagnosis system 100.

On the other hand, the second dataset may come from local hospitals in the Matsu Islands. Statistical data indicate that the local residents have a high incidence rate of gastric cancer. Relevant authorities have invited local residents aged 30 and above to participate in a *Helicobacter pylori* screening program since 2004, and provided them with endoscopy examinations. These examinations have established a database of potential pathological changes and *Helicobacter pylori* infection, and the relevant authorities have used clinical trial methods to extract statistics on the incidence rate and severity of precancerous gastric lesions and *Helicobacter pylori* infection from this database, thereby establishing the second dataset. In the embodiment, the second dataset may be used to validate and evaluate the model established from the first dataset.

In summary, the sample source of the first dataset is broadly representative of the national population, with incidence rate values that are averaged across the entire population. In contrast, the sample source of the second dataset is limited to a high-incidence region, making it suitable for validating and evaluating the recognition results of the first dataset in the artificial intelligence training process. In the embodiment, the images in the first dataset and the second dataset primarily comprise endoscopy images of the stomach body, stomach antrum, and stomach fundus.

To establish standardized histological data for the medical auxiliary diagnosis system 100 to perform subsequent training and analysis, the biopsy sampling methods for the first dataset and the second dataset can be a modification according to the Sydney Protocol. The Sydney Protocol is a standardized protocol for gastric mucosal biopsy, initially developed by a group of Australian gastric disease experts, aimed at standardizing the location and processing of gastric mucosal biopsies to improve diagnostic accuracy and consistency. In the embodiment, gastric mucosal biopsy samples can be obtained from the stomach antrum (at the greater curvature and lesser curvature) and stomach body (at the greater curvature and lesser curvature). Through the standardized sampling procedure, experts can obtain conditionally consistent gastric mucosal biopsy samples, meaning that the sampling locations are consistent for all participants. Experts do not need to know the clinical status of the participants to objectively perform histological assessments, thereby increasing the reliability of statistical data. In the embodiment, the classification of pathological samples comprises acute inflammation (polymorphonuclear cell infiltration), chronic inflammation (lymphoplasmacytic cell infiltration), atrophic gastritis (loss of glandular tissue and fibrous replacement), or intestinal metaplasia (presence of goblet cells and absorptive cells), with each classification having a severity level defined as none, mild, moderate, or severe. Based on the above classification, the severity of precancerous lesions can be assessed using the Operative Link for Gastritis Assessment of Atrophic Gastritis (OLGA) and the Operative Link for Gastritis Assessment of Intestinal Metaplasia (OLGIM) as the staging standards, ranging from stage 0 to stage 4.

In terms of system architecture, the medical auxiliary diagnosis system 100 of the present invention comprises a sampling system 110, a user device 120, and an image analysis system 130, which are interconnected via a network.

In the embodiment, the sampling system 110 refers to hospitals or clinics equipped with detection instruments, comprising an image acquisition device 112 and an image server 114. The image acquisition device 112 refers to instruments such as X-ray machines, computed tomography (CT) scanners, endoscopy examination devices, or various devices that can generate patient examination data. The image server 114 is a Picture Archiving and Communication System (PACS). In the medical field, medical images are transmitted in Digital Imaging and Communications in Medicine (DICOM) format. Therefore, the image acquisition device 112 collects various information from patients and stores it in DICOM format on the image server 114. The user device 120 can be a computer in a hospital's outpatient department or a mobile device held by medical personnel, which can access and view data stored on the image server 114 through a specific program interface and access mechanism. It should be understood that the number of sampling systems 110 can be multiple, distributed across hospitals nationwide, and not limited to large medical centers or rural clinics. The sampling system 110, user device 120, and image analysis system 130 are interconnected via a network, wherein the network is not limited to wired or wireless networks.

The image analysis system 130 represents the primary server that performs artificial intelligence analysis. The image analysis system 130 comprises the first model 131, the second model 132, the third model 133, the preprocessing module 134, the training module 136, and the inference module 138. The image analysis system 130 can be a physical host set up in a large medical center, providing services for medical personnel. To facilitate access to the image analysis system 130 by medical personnel distributed across the country, the image analysis system 130 can adopt a public cloud architecture. In other words, the image analysis system 130 can also be a cloud-based system composed of multiple layers of virtualized services. The public cloud architecture can be divided into at least two functional layers: the frontend interface and the backend platform (not shown). The frontend interface can be provided as a web service, allowing users to operate through a browser on the user device 120. The backend platform can receive image data uploaded from the sampling system 110 or the user device 120 and perform processing, training, and inference. The components of the image analysis system 130 do not necessarily need to be physically set up within a large medical center, but can be distributed across various cloud service providers' virtual services. For example, the components of the image analysis system 130 may be able to adopt customized software as a service (SaaS) or platform as a service (PaaS) solution available on the market. Since public cloud architecture is a well-known technology with high flexibility and multiple solutions, the embodiment will not elaborate further. Therefore, it can be understood that the image analysis system 130 and its component modules are not limited to physical embodiments, and the sampling system 110 and the image analysis system 130 are not limited to being located in the same or various locations.

The preprocessing module 134 is configured to receive image data from the image server 114 and perform preprocessing on the data. The detailed preprocessing process will be described in FIG. 3.

The training module 136 is designed to leverage the preprocessed data from module 134 to perform deep learning, thereby training the first model 131, the second model 132, and the third model 133 to achieve specific goals. In essence, the artificial intelligence models referred to in this invention encompass neural network algorithms and specific parameter combinations of digital data, which can be executed on dedicated hardware and operating system architectures to generate corresponding output results based on input data. In one embodiment, the training module 136 can be an operating system that supports convolutional neural networks (CNNs) and is driven by specific operating systems and software to perform artificial intelligence learning functions. For instance, the training module 136 may comprise Python-written code, a deep learning framework based on TensorFlow, and an NVIDIA DGX A100 graphics card.

The inference module 138 is configured to utilize the first model 131, the second model 132, and the third model 133 to perform inference recognition on input images, thereby obtaining recognition results. The input images can be provided by the user device 120. After receiving the input images from the user device 120, the image analysis system 130 can first preprocess them through the preprocessing module 134 and then transmit them to the inference module 138 to perform the inference recognition process.

The first model 131 is trained by the training module 136 to recognize the stomach region and non-stomach region within upper gastrointestinal endoscopy images.

The second model 132 is trained by the training module 136 to further classify the stomach region recognized by the first model 131 into three categories: antrum, corpus, and fundus.

The third model 133 is trained by the training module 136 to determine whether the antrum and corpus regions have precancerous lesions, such as atrophic gastritis and intestinal metaplasia, as well as *Helicobacter pylori* infection.

The medical auxiliary diagnosis system 100 proposed by the present invention can improve healthcare accessibility in communities and provide real-time patient management evidence-based information for high-incidence areas of gastric cancer. The following flowchart illustrates the implementation process of each module.

Figure 2:
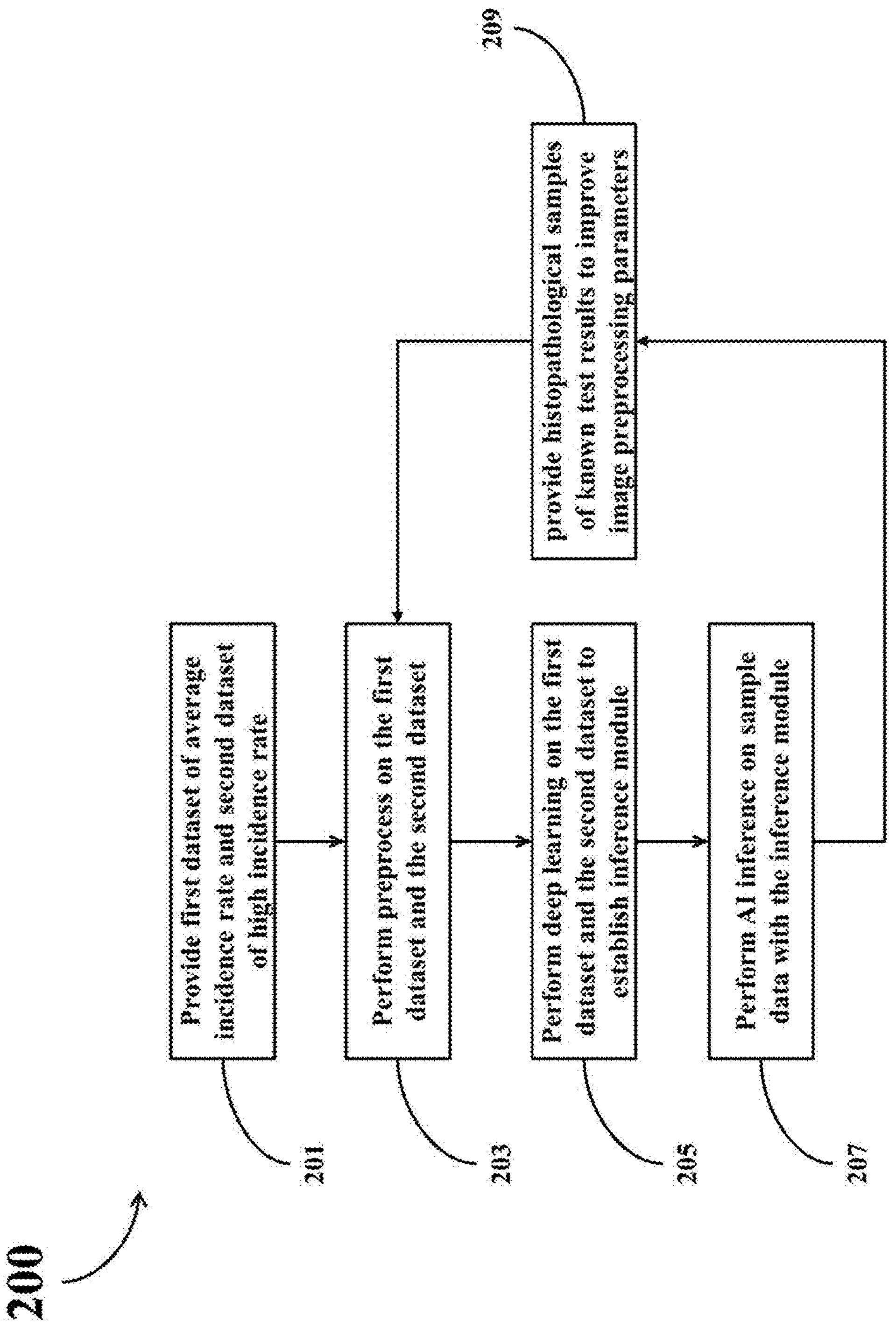
FIG. 2 is a flowchart of the auxiliary medical diagnosis process according to an embodiment of the present invention.

FIG. 2 is a flowchart illustrating an embodiment of the artificial intelligence-based lesion auxiliary medical diagnosis process 200 of the present invention. The embodiment is based on the medical auxiliary diagnosis system 100 architecture shown in FIG. 1, and is implemented in collaboration with the sampling system 110, user device 120, and image analysis system 130.

In step 201, the first dataset of average incidence rate and the second dataset of high incidence rate are provided in the image server 114. In one embodiment, the first dataset comprises endoscopy images and histological examination results of patients with atrophic gastritis and intestinal metaplasia from large medical centers. The second dataset refers to endoscopy images and histological examination results of patients with atrophic gastritis and intestinal metaplasia from specific community hospitals with high incidence rates. In rural or island areas, such as Matsu, due to differences in lifestyle and medical resources, the risk of gastric disease among residents varies significantly, making them suitable sources for the second dataset. The antrum and corpus image data in the first and second datasets can be collected by medical personnel from various locations using the image acquisition device 112 following the modified Sydney Protocol, with standardized file formats, and stored in the image server 114.

In a further embodiment, an image database (not shown) is comprised in the image analysis system 130 for centralized storage of the first dataset collected from large medical centers and the second dataset collected from regional hospitals across the country. The image database implementation is not limited to local storage devices and can be a public cloud solution. The number and location of image servers 114 are not limited. Data transmission between components can be implemented according to known network protocols, which will not be elaborated upon.

Due to the potential for significant differences in data sources and acquisition methods from sampling systems 110 across the country, it is necessary to preprocess the raw images in the data before proceeding to the deep learning stage. This preprocessing step helps to remove unnecessary noise, such as patient information, timestamps, or watermarks, from the original images. Additionally, preprocessing also aids in ensuring that the information learned by the subsequent training module 136 has higher consistency.

In step 203, image preprocessing is performed on the first dataset and the second dataset. The preprocessing steps can be performed either at the sampling system 110 end beforehand or by the preprocessing module 134 in the image analysis system 130. When the first dataset and the second dataset are sent to the preprocessing module 134 for preprocessing, the preprocessing module 134 normalizes the first dataset and the second dataset and converts them into normalized images. These normalized images are then transmitted to the training module 136 for training. The detailed image preprocessing steps will be described in the flowchart of FIG. 3.

In step 205, the first dataset and the second dataset are converted into normalized images by the preprocessing module 134 and input into the training module 136 for deep learning, thereby establishing an inference model.

During operation, the training module 136 can divide the first dataset and the second dataset into training data, validation data, and testing data. The training module 136 uses the cutoff value determined during the training and validation process to train the model, learning to classify the normalized images based on the proportion of small blocks diagnosed as a specific condition. Subsequently, the training module 136 evaluates the performance of the learned model on the testing data. In the embodiment, to accelerate model maturation, the training module 136 adopts transfer learning, fine-tuning a pre-trained model to leverage the existing knowledge in the pre-trained model.

In the embodiment of the present invention, the pre-trained models, such as ResNet and DenseNet, are fine tuned to overcome the difficulties of combining so as to develop the first model 131, the second model 132, and the third model 133. The ResNet neural network, published in 2016, can train deeper convolutional neural networks by using "shortcuts" to connect the front and back layers, allowing gradients to be propagated backwards during training. The DenseNet model, published in 2018, is an improved version of the original DenseNet neural network architecture, which combines the strengths of ResNet. The key feature of DenseNet is that each layer in a block is connected to every other layer in a feed-forward fashion, with feature maps being concatenated in the channel dimension. This allows for N connections in an N-layer convolutional neural network, enhancing feature propagation, reusing features, and reducing model parameters and computation, thereby improving training efficiency.

The first model 131, the second model 132, and the third model 133 in the embodiment are all neural network models trained by the training module 136 based on the first dataset and the second dataset.

The first model 131 is trained to identify the stomach region and non-stomach region in endoscopy images. The second model 132 is trained to further classify the stomach region into corpus, antrum, and pylorus. The third model 133 can further determine whether atrophic gastritis and intestinal metaplasia, which are precancerous lesions, have occurred in the corresponding stomach region images provided by the second model 132, and predict their severity.

When training the first model 131, the second model 132, and the third model 133, the training module 136 can adopt various derivative versions of well-known neural network architectures, such as EfficientNet-b0, EfficientNet-b4, EfficientNet-b6, AlexNet, VGG11, VGG19, ResNet18, ResNet152, DenseNet121, Vision Transformer, and DenseNet201, among others. After completing the final training, the model with the best discriminative ability is selected as the inference model and deployed in the image analysis system 130 for external service.

In the implementation of training the first model 131 and the second model 132, the image analysis system 130 can utilize data from large medical centers, such as National Taiwan University Hospital, with patients as the unit, randomly shuffling and taking 80% for training and 20% for validation. Additionally, for testing, data from high-risk area hospitals, such as Matsu data, can be used to evaluate the accuracy and stability of the first model 131 or the second model 132.

To train the third model 133 to predict the severity of pathological lesions (atrophic gastritis and intestinal metaplasia), the data provided to the training module 136 must first exclude patients with missing pathological biopsy results and select image data from the antrum and corpus regions as input values. The selection of stomach region images can be performed using the first model 131 and the second model 132, which have already been trained in the above embodiments.

When training the third model 133, the distribution ratio of the training set, validation set, and testing set can be flexibly set and dynamically adjusted based on performance. For example, in the first training approach, the training module 136 can select data from rural hospitals or high-risk datasets, such as Matsu data, as input data from the image server 114. The input data can be allocated as 70% for the training set, 20% for the testing set, and 10% for the validation set. In the second training approach, data from National Taiwan University Hospital can be added for mixed training. In the mixed training embodiment, the data from large medical centers, such as National Taiwan University Hospital, can be allocated in an 8:2 ratio to the training set and validation set. Alternatively, all National Taiwan University Hospital data can be allocated to the training set, and 10% of Matsu data can be selected for the validation set. Or, all National Taiwan University Hospital data can be mixed with 70% of Matsu data and allocated to the training set, while 10% of Matsu data is allocated to the validation set. Experiments show that training models with mixed data from various sources in the training set results in better model performance and higher generalization ability.

In the embodiment, to train the first model 131 to distinguish between stomach and non-stomach images, the training module 136 can read a large number of original endoscopy images from the image server 114 as the input dataset and use a convolutional neural network to learn the features of the stomach region. The training module 136 can allocate 70% of the input dataset as the training set, 20% as the validation set, and 10% as the testing set. Experiments show that when the first model 131 uses DenseNet201 as the template model, the training results have better performance. DenseNet201 is a deep neural network architecture that belongs to the DenseNet series. It consists of dense blocks and has a very deep network structure with a total of 201 layers. DenseNet201 is trained using the known ImageNet dataset and is mainly used for image classification tasks. Compared to shallower networks, DenseNet201 has stronger feature extraction capabilities. Its core idea is dense connection, where each layer's input is connected to the output of all previous layers. This design allows information to be more fully transmitted and utilized, effectively alleviating the vanishing gradient problem, promoting feature reuse, and improving network efficiency and performance. The network structure of DenseNet201 is relatively complex, consisting of multiple dense blocks and transition layers. The layers within the dense blocks share information through direct connections, while the transition layers adjust the feature map size and number to help the network adapt to different input sizes and complexities. DenseNet201 has demonstrated excellent performance in many computer vision tasks, such as image classification, object detection, and semantic segmentation. It has superior performance in extracting image features and is widely applied in various practical applications, achieving noteworthy results in many competitions and academic research.

The second model 132 is a model that can classify the stomach region, allowing the inference module 138 to divide the stomach region images into antrum, corpus, and pylorus after execution. To train the second model 132 to achieve this functionality, the training module 136 can read a large number of original images from the image server 114, which are collected from large medical centers and community hospitals. The original images from large medical centers are allocated as 80% for the training set and 20% for the validation set. The original images from community hospitals are allocated as 10% for the testing set. The training set and the validation set use data obtained from large medical centers, where the disease incidence rate is biased towards the national average. The testing set mainly uses data obtained from specific community hospitals, which are known to have a higher disease incidence rate than the national average. Experiments show that the training results of the DenseNet121 model can achieve better performance, so DenseNet121 is selected for deployment as the second model 132. Similar to DenseNet201, DenseNet121 is also part of the DenseNet series, consisting of multiple dense blocks, with a total of 121 layers.

The third model 133 is a model that can predict and identify precancerous stomach diseases. In the training process of the third model 133 by the training module 136, all data from large medical centers and 70% of data from community hospitals are used. In the validation process of the third model 133, 10% of community hospital data is used. In the testing process of the third model 133, 20% of community hospital data is used. For example, the training module 136 can train the third model 133 using only the Matsu dataset and try to apply multiple template models, including EfficientNet-b0, EfficientNet-b4, EfficientNet-b6, AlexNet, VGG11, VGG19, ResNet18, ResNet50, ResNet152, DenseNet121, DenseNet201, and 11 convolutional neural network models, as well as Vision Transformer (VIT) architecture models. The training results of each template model are evaluated based on the Micro-AUC indicator, and it is found that the Vision Transformer model has a 13-37% improvement in performance compared to various convolutional neural network models. Therefore, the third model 133 can adopt the Vision Transformer model for the diagnosis, validation, and testing of atrophic gastritis and intestinal metaplasia, which are precancerous lesions.

The training results of the training module 136 can be evaluated through a performance evaluation program to determine whether to deploy the models to the image analysis system 130. When evaluating the trained models, the embodiment can adopt sensitivity, specificity, and the area under the receiver operating characteristic (AUROC) curve. In the baseline characteristics of the test subjects, categorical data is represented as a percentage (%), and continuous data is represented as a mean (standard deviation). These indicators can verify whether the various inference models can correctly identify positive and negative cases, and manage imbalanced datasets. In the embodiment, the training module 136 can use 95% confidence intervals (CIs) to evaluate the statistical significance of the trained first model 131, second model 132, and third model 133. During the training process of the first model 131, second model 132, and third model 133 by the training module 136, multiple template models can be trained simultaneously, and the model with the highest AUROC performance is selected and deployed to the image analysis system 130 as the inference model for practical application. In other words, the first model 131, second model 132, and third model 133 deployed in the image analysis system 130 are all selected by the training module 136 based on the AUROC performance of various template models and input data after completing the training.

The third model 133 trained in the embodiment can be validated in a real-world environment. For example, researchers can compare the results of endoscopy and histopathological evaluation of patients with positive serum pepsinogen tests with the analysis results of the medical auxiliary diagnosis system 100. The actual measurement shows that the medical auxiliary diagnosis system 100 can correctly identify 96.2% of images with anatomical locations and 97.5% of images with stomach regions. In terms of histopathological prediction, the positive predictive value (PPV) and negative predictive value (NPV) for diagnosing precancerous lesions of gastric cancer are 0.583 (95% CI: 0.468-0.690) and 0.881 (0.815-0.925), respectively.

In further embodiments, to improve the recognition performance of the third model 133, the preprocessing module

134 can perform Contrast Limited Adaptive Histogram Equalization (CLAHE) operations on the input image data before training, to enhance image details and highlight stomach mucosa features. CLAHE is an image processing technique aimed at enhancing image contrast. It is a variant of Histogram Equalization (HE) that solves the problem of over-enhancement of noise in local contrast enhancement. The working principle of CLAHE is to divide the image into multiple local regions, and then apply HE to each region, thereby achieving local contrast enhancement in the entire image. However, unlike standard HE, CLAHE limits the local contrast enhancement to avoid over-enhancement results. This is achieved by clipping and re-distributing the histogram of pixels in local regions. A key parameter of CLAHE is the "contrast limit", which controls the equalization degree of pixel brightness values in local regions. The larger the contrast limit, the more obvious the contrast enhancement effect, but it may lead to over-enhancement results. Therefore, adjusting the contrast limit appropriately can achieve the optimal CLAHE effect.

The trained first model 131 can identify the stomach region in endoscopy images, while the second model 132 can classify the images into various parts such as the antrum, corpus, and pylorus. The third model 133 can predict the severity of pathological lesions (atrophic gastritis and intestinal metaplasia) based on the classified images from the second model 132. In further derived embodiments, by using different input images and parameter tuning, the second model 132 can also be trained to classify other parts such as the esophagus, duodenum, and so on, while the third model 133 can be further trained to detect *Helicobacter pylori* in the antrum, corpus, and pylorus.

In step 207, the inference module 138 receives sample data and uses the inference module established in step 205 to perform artificial intelligence inference. When the medical auxiliary diagnosis system 100 is open to external services, users of the user device 120 can upload new patient sample data to the cloud at any time, which will be processed by the inference module 138 in the image analysis system 130. The inference module 138 will utilize the knowledge learned by the first model 131, second model 132, and third model 133 to effectively identify various features in the sample data in sequence, and finally determine whether there is a risk of gastric cancer. In practice, the hardware and operating system architecture used by the inference module 138 can be the same as or shared with the training module 136, and can load the first model 131, second model 132, and third model 133 to perform corresponding artificial intelligence inference services. The further detailed steps of the inference module 138 performing inference will be described in FIG. 4.

In step 209, the image analysis system 130 receives histopathological samples of known test results to improve image preprocessing parameters. In other words, when users use the medical auxiliary diagnosis system 100 in a real-world environment, they can actively provide histopathological samples with known test results to the image analysis system 130 to help verify or improve model performance. The inference module 138 of the medical auxiliary diagnosis system 100 achieves approximately 80% sensitivity and specificity in diagnosing precancerous lesions.

When the image analysis system 130 receives these histopathological samples with known test results, it can similarly perform step 203 to preprocess the input histopathological sample images, and then have the inference module 138 perform the inference program. By applying the analysis results of the first model 131, second model 132, and third model 133 to these positive individuals, the PPV and NPV performance of the first model 131, second model 132, or third model 133 can be verified, along with their corresponding 95% confidence intervals.

Figure 3:
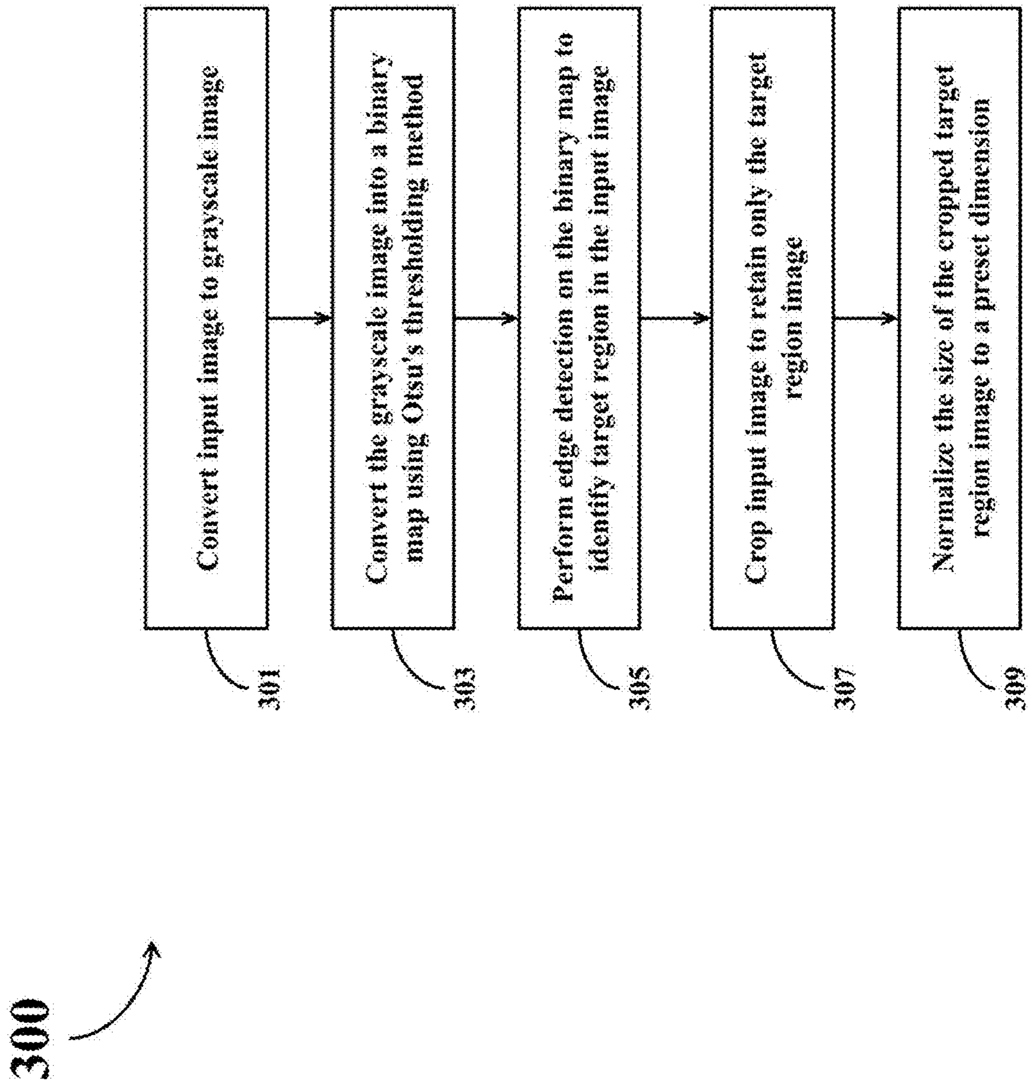
FIG. 3 is a flowchart of the image preprocessing process according to an embodiment of the present invention.

FIG. 3 is a schematic diagram of the image preprocessing flow 300 performed by the preprocessing module 134 of the present invention. The embodiment further explains the detailed steps of step 202. The image format transmitted from the sampling system 110 or user device 120 to the image analysis system 130 may vary due to differences in instrument type and brand, resulting in different resolutions and information formats. For example, traditional endoscopy images may have varying sizes, such as 720*480, 640*480, or 512*384, and may contain timestamp or watermark noise. Before proceeding to the deep learning stage, it is necessary to preprocess the original images to resolve the issue of inconsistent image formats or noise interference. The preprocessing program helps the training module 136 to focus on processing mucosal surface images containing key information during deep learning.

In step 301, the preprocessing module 134 converts the input image received from the sampling system 110 or user device 120 into a grayscale image. The input image is typically a color endoscopy image, converted into a grayscale image in this step to facilitate subsequent processing.

In step 303, the grayscale image is converted into a binary map using Otsu's thresholding method. Otsu's method is an image processing technique used to automatically determine the threshold value for binarizing an image. First, the grayscale histogram of the image is analyzed to find a threshold value that separates the image into two classes (foreground and background), such that the intra-class variance is minimized and the inter-class variance is maximized. In other words, the threshold value calculated by Otsu's method can maximize the difference between different classes and minimize the variation within the same class.

When the preprocessing module 134 calculates the threshold value using Otsu's method, it first calculates the grayscale histogram of the image to statistically count the number of pixels at each grayscale level. Then, for each possible threshold value (i.e., 0 to 255), the image is divided into two classes, and the number of pixels and average grayscale value are calculated for each class. For each possible threshold value, the intra-class variance and inter-class variance are separately calculated. Finally, among all threshold values, the one with the maximum inter-class variance is selected as the optimal threshold value and used for image binarization. Otsu's method is commonly used in image segmentation, edge detection, and target recognition, particularly in situations where automatic processing of substantial amounts of images is required. It is a simple yet effective image processing technique that can help improve the accuracy and efficiency of image processing.

In step 305, the preprocessing module 134 performs edge detection on the binary map to identify the target region in the input image. Based on the object edges in the binary map, the preprocessing module 134 can identify the region with the largest area (determined by the maximum and minimum coordinates on the x-axis and y-axis).

In step 307, the preprocessing module 134, based on the identification result of step 305, crops the input image to retain only the target region image. In other words, the areas of the input image that do not belong to the target region are cropped and discarded, leaving a specific aspect ratio image file. In one embodiment, the aspect ratio of the cropped image file is set to 1:1, i.e., a square image.

In step 309, the preprocessing module 134 normalizes the size of the cropped target region image to a preset dimension. For example, the preprocessing module 134 can use image resizing algorithms to adjust the size of the cropped image to a square pixel size of 256×256 or 128×128. These preprocessing steps ensure that the images are properly prepared for subsequent deep learning training.

Figure 4:
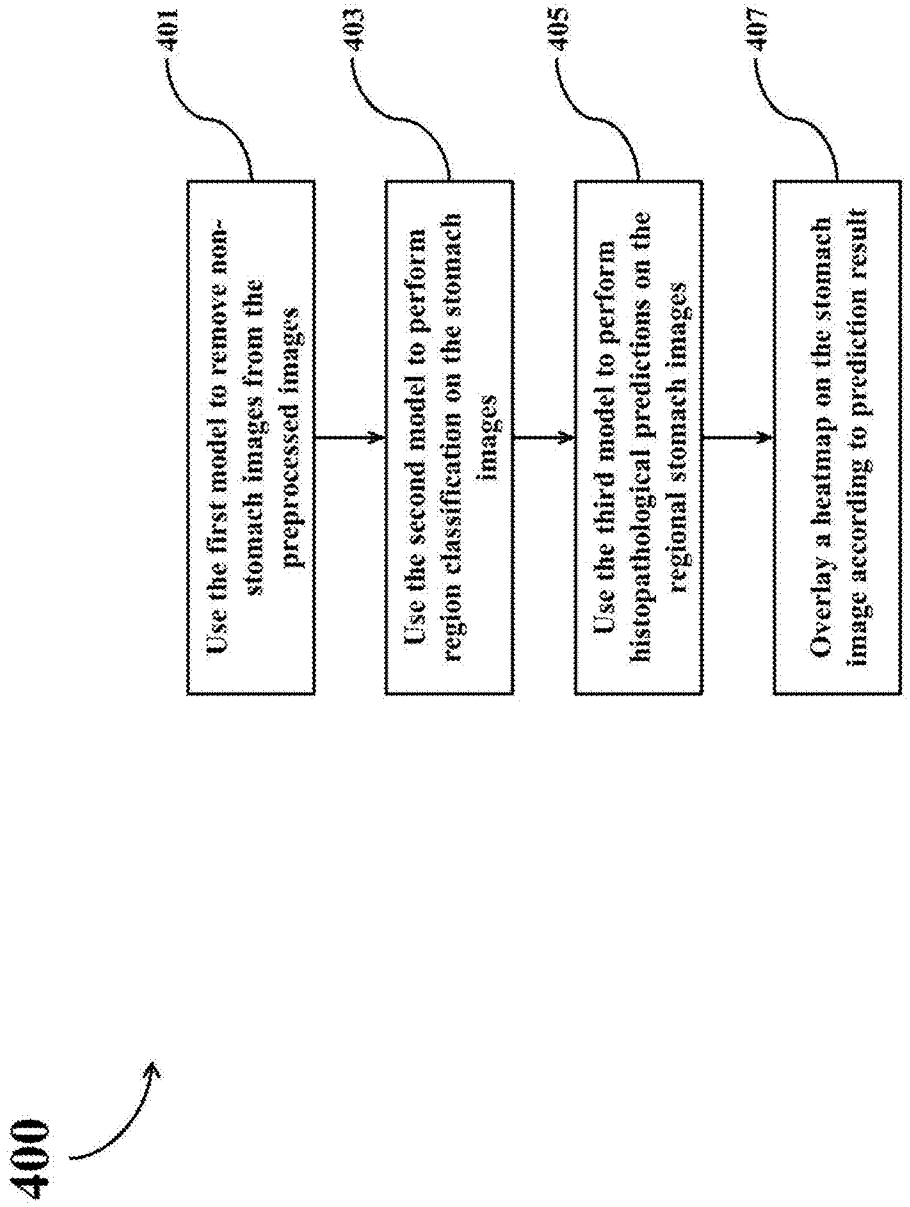
FIG. 4 is a flowchart of the image inference process according to an embodiment of the present invention.

FIG. 4 is a schematic diagram of an artificial intelligence pathology image inference process 400 of one embodiment of the present invention.

In step 401, the inference module 138 employs the first model 131 to remove non-stomach images from the preprocessed images. In the embodiment, the first model 131 is a DenseNet201 model trained in step 205 of FIG. 2.

In step 403, the inference module 138 employs the second model 132 to perform region classification on the stomach images.

In step 405, the inference module 138 employs the third model 133 to perform histopathological predictions on the regional stomach images.

In step 407, a heat map is overlaid on the stomach images according to the prediction result. To gain a deeper understanding of the inference process of the first model 131, second model 132, and third model 133, the embodiment also utilizes Gradient-weighted Class Activation Mapping (Grad-CAM) to generate heatmaps, visualizing the important regions in the input images. Grad-CAM is a visualization method for deep learning model predictions, which explains the model's predictions for a specific class by visualizing the importance of each feature map in the neural network. Grad-CAM uses gradient information from backpropagation to calculate the importance of each feature map for the model's final prediction. These gradients reflect the activation degree of each feature map contributing to the specific class prediction. The Grad-CAM operation can be performed by the preprocessing module 134 in the image analysis system 130 or by the inference module 138. For example, the inference module 138 can generate class activation maps based on the prediction result and gradient information, highlighting the regions in the input image that are important for the model's final prediction. These regions are typically related to the areas the model focuses on when predicting a specific class. By overlaying the class activation maps with the original image, an additional color bias visual effect is produced, which can be used to emphasize the regions of interest. This helps to understand the model's inference process and determine whether the artificial intelligence recognition results are consistent with expert experience.

In the prior art of diagnosing precancerous gastric diseases in high-risk populations, there is often an over-reliance on substantial amounts of homogeneous data sources, such as images selected from resource-rich large hospitals. The medical auxiliary diagnosis system 100 proposed by this invention not only integrates artificial intelligence models to simulate medical judgment thinking processes but also incorporates medical data from resource-limited regions into the analysis. The implementation of this invention brings several advantages. For example, the quality of traditional endoscopy images, such as proximity and blur, affects the step-by-step process of image classification. The implementation of this invention renders a heatmap overlay effect, which can assist endoscopy doctors in evaluating the prediction result of the medical auxiliary diagnosis system 100. In traditional methods, sampling angle errors in endoscopy images affect the judgment ability of artificial intelligence systems. This invention not only follows standardized sampling procedures for histopathology but also generates normalized image data through image preprocessing programs, effectively reducing error variables. When using the third model 133 to predict precancerous gastric diseases, this invention also enhances mucosal image details, effectively assisting endoscopy image analysis work. Furthermore, the artificial intelligence prediction model of this implementation considers precancerous conditions when performing predictive analysis on samples. The actual execution results show that the overall disease rate has a higher negative predictive value. This indicates that the medical auxiliary diagnosis system 100 of this invention can effectively reduce the need for low-risk gastric cancer patients to undergo endoscopy monitoring, saving unnecessary medical costs.

The medical auxiliary diagnosis system 100 of this invention is a comprehensive solution that covers data collection, model development, and on-site implementation. Unlike traditional approaches that only focus on model development, the medical auxiliary diagnosis system 100 can improve recognition accuracy based on feedback from doctors' clinical experiences during implementation. The system also incorporates the concept of end-to-end services, enabling it to extract information from endoscopy images stored in the image server 114. The image analysis system 130 can flexibly utilize various image diagnosis or detection-related artificial intelligence algorithms. The medical auxiliary diagnosis system 100 of this invention has a unique approach to data utilization. Traditional training data mainly come from large medical centers. When researchers classify anatomical locations and stomach regions, training data from community hospitals can still be applicable. However, when performing histopathological grading, it is necessary to have a higher sensitivity to subtle mucosal changes in the samples. Technical parameter or image quality errors in image data from diverse sources can easily lead to recognition errors.

The implementation of this invention aims to address the aforementioned technical bottlenecks by incorporating data from community hospitals into the training process and utilizing models with self-attention mechanisms to capture relationships between patches, thereby making the prediction more dependable. The medical auxiliary diagnosis system 100 of this invention uses federated learning to enhance the model's generalization ability across different data qualities and distributions in various regions. Federated learning is a distributed training method for machine learning that aims to protect data privacy while achieving centralized model training. Unlike traditional centralized training, federated learning pushes the training process to local devices where the data resides, rather than collecting data to a centralized server. In federated learning, each participating party trains a local model using local data, and then the local model updates are anonymously aggregated to form a global model on the central server. The central server distributes the global model updates to all participating parties, and the process is repeated until the model converges or reaches a stopping criterion. One of the main advantages of federated learning is that it protects user data privacy, as data remains local and does not need to be transmitted to a central server. This approach helps avoid data leakage and privacy infringement risks. Additionally, federated learning helps solve data dispersion and imbalance issues, as each participating party can train using their own local data, without needing to centralize data in one place.

The medical auxiliary diagnosis system 100 of this invention also provides a comprehensive histopathological prediction for each stomach bottom and stomach body image, exceeding the requirements of traditional gastritis assessment systems such as OLGA (Operative Link for Gastritis Assessment) or OLGIM (Operative Link for Gastritis Assessment of Intestinal Metaplasia). The AI-generated information produced by this system can serve as a basis for further long-term research, continuously enhancing the ability to predict gastric cancer risk.

In summary, the medical auxiliary diagnosis system 100 of this invention can serve as a valuable deep learning service system in remote healthcare, particularly for diagnosing precancerous gastric conditions and *Helicobacter pylori* infections in resource-limited areas. This system improves the accessibility of medical services and optimizes the allocation of limited resources to those who truly need them.

Figure 5:
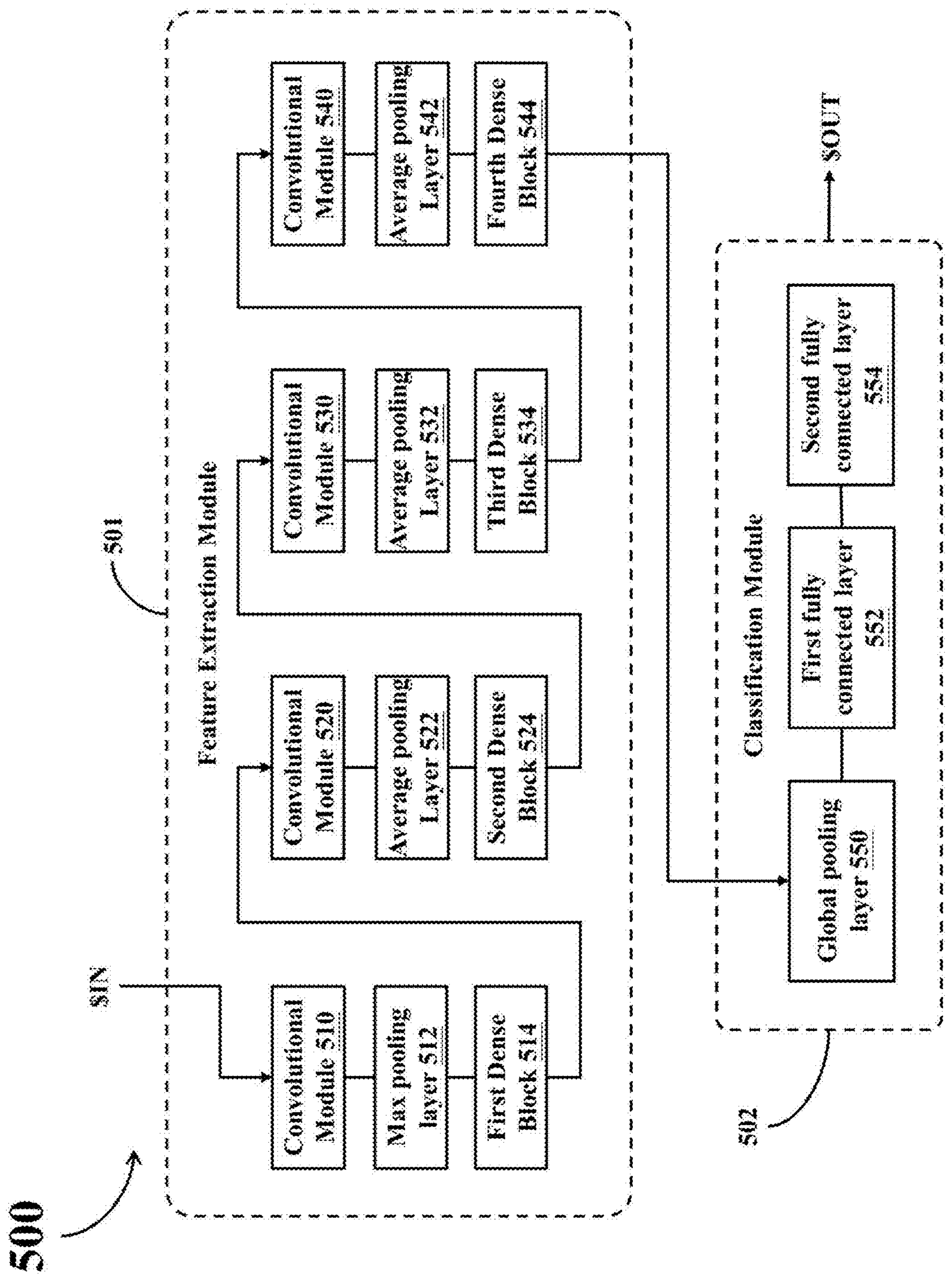
FIG. 5 shows a Vision Transformer according to an embodiment of the present invention.

FIG. 5 is a schematic diagram of the second model 132 of an embodiment of the present invention. In practice, the second model 132 is modified based on the DenseNet121 neural network architecture. The input image $IN undergoes two stages of processing, including a feature extraction module 501 and a classification module 502, to produce the output result $OUT.

The feature extraction module 501 is primarily responsible for extracting meaningful features from the input image $IN. In the embodiment, the feature extraction module 501 generates a high-level summary of the input image $IN through multiple iterations of neural network layers, and the high-level summary is thereafter used for classification by the classification module 502. In the embodiment, the feature extraction module 501 consists of multiple operational blocks, which are connected in sequence according to the data flow of processing the input image $IN, including convolutional module 510, max pooling layer 512, first dense block 514, convolutional module 520, average pooling layer 522, second dense block 524, convolutional module 530, average pooling layer 532, third dense block 534, convolutional module 540, average pooling layer 542, and fourth dense block 544.

The convolutional modules 510, 520, 530, and 540 refer to the convolutional layers in a neural network, which are the key components that perform convolutional operations to extract features from the input data. The convolutional operation involves sliding a small filter (also known as a convolutional kernel or filter) over the input data, computing the dot product between the filter and the input data, and producing an output feature map. The parameters of the filter can be updated and optimized through iterative training. By performing multiple iterations of convolutional operations on the input image $IN, the feature extraction module 501 can extract various different features from the data, such as edges, textures, shapes, and others, which serve as a basis for the subsequent classification by the classification module 502.

The visual transformer 500 of the embodiment is an improved version of the DenseNet architecture. The output of each convolutional module is processed through pooling and dense block operations before being fed into the next convolutional module. For example, the output of convolutional module 510 is processed through max pooling layer 512 and first dense block 514 before being passed to convolutional module 520, and so on.

As shown in FIG. 5, the max pooling layer 512 is coupled to the output of convolutional module 510, set to reduce the spatial dimensions of the feature map output by convolutional module 510 while preserving notable features. In other words, the maximum value in each region of the feature map is retained, while other values are discarded, thereby achieving compression of the feature map. The convolutional module 510 helps to reduce the number of model parameters and computations, while improving the translation invariance of features, making the second model 132 more robust to small variations in the input image.

The first dense block 514 is coupled to the output of the max pooling layer 512 and can form direct connections with the subsequent convolutional modules 520, 530, and 540, receiving the feature maps fed back from the subsequent convolutional modules 520, 530 (not shown), and 540 (not shown). The first dense block 514 concatenates the feature maps output by convolutional module 510 after max pooling layer 512, as well as the feature maps fed back from convolutional modules 520, 530, and 540, along the channel dimension, to form the input value of convolutional module 520. The dense block setting is a core feature of DenseNet, which promotes information flow and feature reuse. Since the output of each convolutional module is connected to the input of all previous convolutional modules, it can enhance the expressive power of features, alleviate the vanishing gradient problem, and make the model easier to train and optimize.

The average pooling layer 522 is coupled to the output of convolutional module 520, used to reduce the spatial dimensions of the feature map, thereby reducing the number of model parameters and computations. The average pooling layer 522 takes the average of pixel values in the input region, reducing the spatial dimensions of the feature map, and thereby reducing the number of model parameters and computations. This helps to alleviate the model's overfitting problem and improve the model's computational efficiency. Unlike the max pooling layer 512, the average pooling layer 522 preserves the information of all pixel values in the input region, rather than just the maximum value. This means that the average pooling layer 522 focuses more on the overall average representation of features, rather than the extraction of local prominent features. Furthermore, the average pooling layer 522 can smooth out local variations in the feature map, reducing the impact of noise on the feature map.

The second dense block 524 is coupled to the output of the average pooling layer 522, forming direct connections with the subsequent convolutional modules 530 and 540, and receiving the feature maps fed back from the subsequent convolutional modules 530 and 540 (connections therebetween is not shown). The subsequent average pooling layers 532 and 542 in FIG. 5 operate in the same way as the average pooling layer 522. The second dense block 524, third dense block 534, and fourth dense block 544 operate in the same way as the first dense block 514. The convolutional modules 530 and 540 operate in the same way as the convolutional module 520, and will not be repeated here. After the iterative operations of the above components, the feature extraction module 501 generates the feature map of the input image $IN and transmits it to the classification module 502.

In summary, the feature extraction module 501 in FIG. 5 implements a four-layer convolutional neural network for feature extraction, but does not implement a fully connected layer. The hyperparameters used in the classification module 502 can be optimized through the Hyperband algorithm, which balances the computational resources for each hyperparameter combination and finds the best hyperparameters to be used as the basis for the subsequent classification module 502. Hyperband is a high-efficiency algorithm for optimizing hyperparameters, which combines random search and resource allocation strategies to effectively find the best hyperparameter combination under limited computational resources.

In the embodiment, the input image $IN can be a gastroscopic image provided by the image server 114, such as the first data and second data shown in FIG. 2. These images are preprocessed by the preprocessing module 134 and then transmitted to the feature extraction module 501 for training. The initial weights required for the convolutional neural network operation of the feature extraction module 501 can be adopted from the pre-trained weights of a known image network model, such as ImageNet. The weight values will be fine-tuned gradually as the feature extraction module 501 learns from the images.

The classification module 502 is primarily responsible for classifying the input image $IN. The classification module 502 can calculate the probability of the input image $IN belonging to each class based on the feature map generated by the feature extraction module 501. In deep learning, the classification module 502 typically sets up a fully connected layer after the feature extraction module 501 to implement the classification function. The classification module 502 in the embodiment comprises a global pooling layer 550, a first fully connected layer 552, and a second fully connected layer 554.

The global pooling layer 550 is a type of pooling operation that reduces the spatial dimensions of the feature map provided by the feature extraction module 501 to a fixed-size vector. Unlike local pooling, global pooling does not consider regions and instead acts directly on the entire feature map. In one embodiment, the global pooling layer 550 performs a global average pooling operation, which averages each channel of the entire feature map to obtain the average value of each channel. The resulting vector represents the average feature of the entire feature map. The global pooling layer 550 combines the information of the entire feature map into a fixed-size vector, which can improve the computational efficiency and generalization ability of the model.

After the global pooling layer 550, the first fully connected layer 552 and the second fully connected layer 554 are connected. The first fully connected layer 552 is a 64-layer fully connected layer, and the second fully connected layer 554 is a 480-layer fully connected layer. A fully connected layer, also known as a dense layer, is a common structure in deep learning models. The first fully connected layer 552 and the second fully connected layer 554 are located at the end of the visual transformer 500, used to integrate and combine the features from the previous layers, and output the final prediction result.

In the first fully connected layer 552 and the second fully connected layer 554, each neuron is connected to all neurons in the previous layer, and each connection has a weight, allowing all information from the previous layer to be transmitted to the fully connected layer. Each neuron in the first fully connected layer 552 and the second fully connected layer 554 can learn distinct aspects or features of the input data, enabling the model to learn more complex nonlinear relationships and perform more accurate modeling of the input data. Since each neuron in the first fully connected layer 552 and the second fully connected layer 554 is connected to all neurons in the previous layer, the number of parameters is large, and overfitting may occur. To address this, the embodiment of this invention uses two fully connected layers with different numbers of neurons connected in series, which can adjust the computational complexity of the classification module 502.

In one embodiment, the classification module 502 can use the SoftMax activation function to output the probability values of 3 gastric locations. The SoftMax activation function can map a vector with arbitrary real values to a probability distribution, making it well-suited for solving classification problems. For example, the output of the first fully connected layer 552 and the second fully connected layer 554 is typically a matrix vector, which can be transformed into a probability distribution of multiple answers through the SoftMax activation function.

In practice, the formula for the SoftMax activation function is as follows:

$$\text{Softmax}(x_i) = \frac{e^{x_i}}{\sum_{j=1}^{K} e^{x_j}}$$

Where the denominator is the sum of the exponential values of all elements X1 to XK in a K-dimensional real vector, and the numerator is the natural exponential value of the i-th element Xi. The result of the division is the occurrence probability of the i-th element Xi. The SoftMax activation function maps an input K-dimensional vector to a probability distribution, where each element Xi is normalized to a probability value after being exponentiated. The output values of the SoftMax activation function range from 0 to 1, and the sum of all outputs is 1, which can be interpreted as a probability distribution. If each element represents a class, the SoftMax activation function can be applied to multi-class classification problems for probability prediction.

In the embodiment of the visual transformer 500, the transfer learning approach is adopted, utilizing a known template model with fine-tuned parameters to accelerate model training. In the embodiment, the hyperparameters used to train the visual transformer 500 are as follows. The batch size is set to 32. The maximum number of iterations (Epoch) is set to 50. Categorical cross-entropy is chosen for the loss function to perform multi-class classification tasks. The optimizer is implemented with Adam. The initial learning rate is set to 0.001, with a ReduceLROnPlateau callback function, where patience is set to 3, step factor is set to 0.2, and thereby the validation loss is monitored.

The callback function ReduceLROnPlateau adjusts the learning rate dynamically based on the performance on the validation set, helping the optimization algorithm to converge faster or avoid getting stuck in local minima. The validation loss is a performance metric used to evaluate the difference between the model's predictions on the validation set and the true labels. The validation loss can be calculated using the cross-entropy loss function. A lower validation loss indicates that the model's predictions on the validation set are closer to the true situation, i.e., the model is more accurate.

Figure 6:
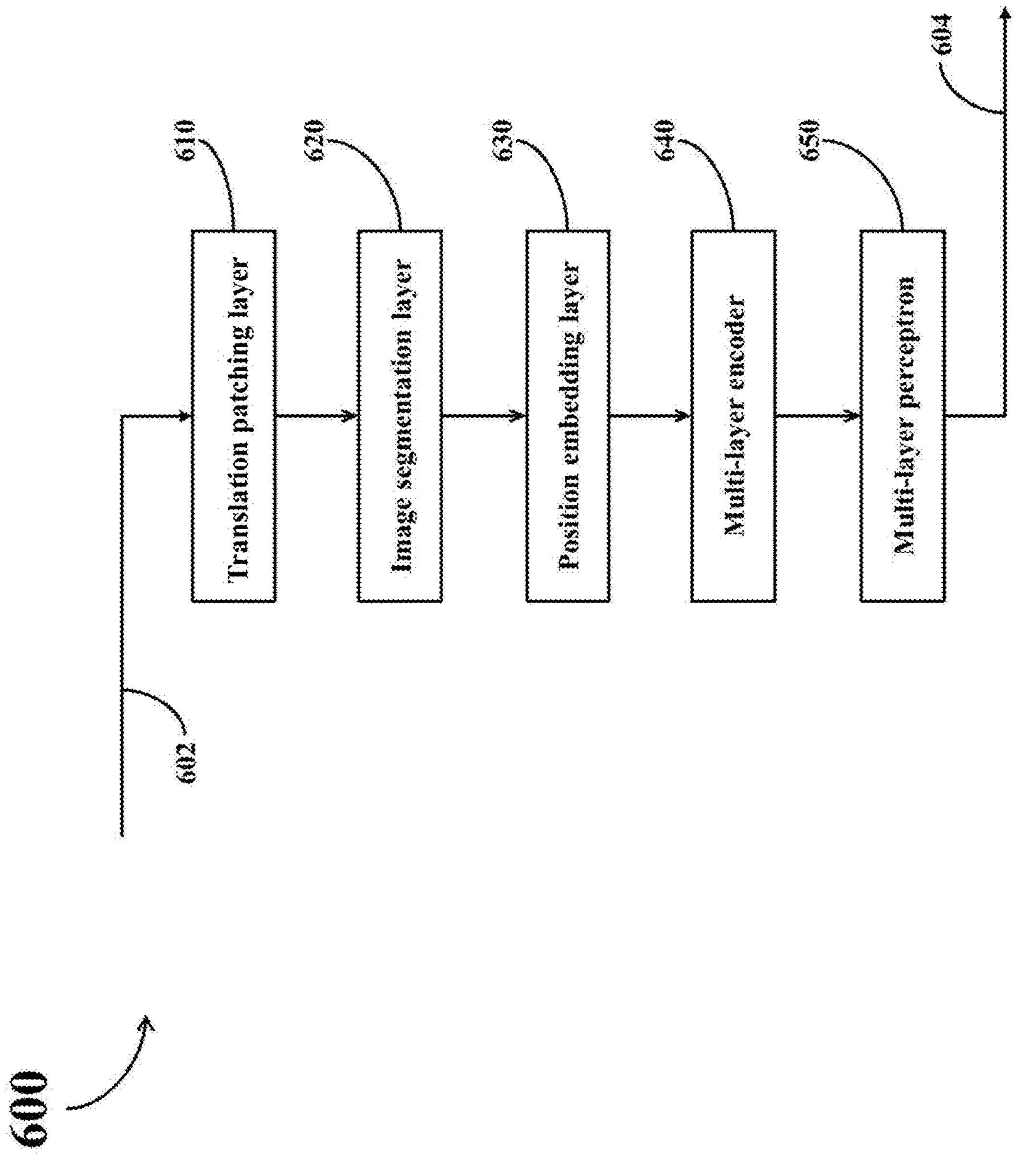
FIG. 6 is a training process of the third model according to an embodiment of the present invention.

FIG. 6 is an embodiment of the visual transformer model 600 of the present invention, used to illustrate the training process of the third model 133.

In 2017, the Google team proposed a transformer neural network employing self-attention mechanisms, thereby enabling parallelized training and capturing global information, which has become a classic model in natural language processing. The Vision Transformer (ViT) was introduced in 2021, further breaking down the barriers between natural language processing and computer vision based on the transformer network. The Vision Transformer is applicable to image classification and other computer vision tasks. Similarly, ViT employs self-attention mechanisms to capture global and local information in images, thereby unaffected by the size of convolutional kernels. The basic structure of the ViT model is a stack of multiple transformer modules, each comprising multiple attention heads. Each attention head compares each position in the input feature map with all other positions and assigns a weight to each position based on their relevance. Thereby, the model can learn the relationships between various positions in the image, effectively capturing global and local information. The ViT model has a simple structure, making it easy to extend to different image sizes and tasks. Furthermore, to manage positional information in images, ViT introduces positional encoding techniques, embedding coordinate information into feature representations. Since the ViT model processes information at different scales simultaneously through multiple attention heads, it can improve the model's generalization ability. The ViT model has demonstrated superior performance in various computer vision tasks, including image classification, object detection, and semantic segmentation. In the present invention, the self-attention mechanism is applied to the third model 133, thereby effectively identifying whether input images contain atrophic gastritis and intestinal metaplasia precancerous lesions.

Compared to convolutional neural networks (CNNs), Vision Transformers (ViTs) generally lack translation equivariance and locality information, and require large-scale datasets for transfer learning to achieve comparable performance. To address this issue, the embodiment of the present invention integrates shifted patch tokenization and locality self-attention mechanisms into the traditional ViT process, forming the visual transformer model 600 as shown in FIG. 6.

FIG. 6 decomposes the visual transformer model into multiple processing streams, with each layer explained in detail. It can be understood that the contents of each layer essentially represent logical execution steps, rather than being limited to specific hardware or software embodiments.

In FIG. 6, the translation patching layer 610 receives the input image 602 and translates the input image 602 along the four diagonal directions (top-left, top-right, bottom-left, and bottom-right) to form four shifted images. The translation patching layer 610 then stacks these four shifted images with the input image 602, thereby forming a shifted stack image.

The image segmentation layer 620 is connected to the output end of the translation patching layer 610, cutting the aforementioned shifted stack image into multiple patches and flattening them into a one-dimensional sequence. Each patch represents a local region of the input image 602. The image segmentation layer 620 may also comprise linear projection and normalization operations, such that each patch corresponds to a fixed-length feature vector, similar to a token in natural language processing.

The position embedding layer 630 receives the multiple patches output by the image segmentation layer 620 and adds positional information to each patch. In practice, the position embedding layer 630 can add the position encoding of each patch to the feature vector of the patch.

The multi-layer encoder 640 is connected to the output end of the position embedding layer 630 and performs feature extraction on the input multiple patches. The multi-layer encoder 640 may comprise multi-head attention modules, forming a multi-layer iterative architecture, which learns and extracts notable features of each patch through repeated self-attention operations and normalization operations. One or more multi-head attention modules in the multi-layer encoder 640 can perform local self-attention operations. The local self-attention operation only calculates the relationships between each patch and its neighboring patches, without processing non-neighboring patches. Therefore, the multi-layer encoder 640 can prioritize and emphasize the local important regions with higher relevance, enabling the model to capture the feature vector matrix of the image more effectively.

The multi-layer perceptron 650 is connected to the output end of the multi-layer encoder 640 and serves as the final processing stage of the vision transformer model 600. It can pool the feature vector matrix output by the multi-layer encoder 640 to obtain a probability distribution matrix 604 that represents the entire input image 602. In the vision transformer model 600 of the embodiment, the multi-layer perceptron 650 can be one or more fully connected layers located at the top of the deep learning model, used to transform the feature representations learned by the model into final task predictions or classification results. The design of the multi-layer perceptron 650 depends on the specific task and model structure, and can typically be customized by adjusting parameters such as the number of layers, the number of neurons, and the activation functions.

In the implementation of the vision transformer model 600, it is possible to first use an open-source dataset of colon cancer tissue slice images (5000, 150, 150, 3) for pre-training the model for 20 training epochs to obtain an initial weight vector matrix. Then, using transfer learning, the initial weight vector matrix can be input into the vision transformer model 600 for further fine-tuning. The number of fully connected layers in the multi-layer perceptron 650 can be adjusted according to the number of classes to be classified. In the embodiment, the vision transformer model 600 predicts the disease in a multi-label form, so the multi-layer perceptron 650 can use the Sigmoid activation function to classify the output of the pathological severity degree, (severity 0, severity 1, severity 2).

The Sigmoid function formula is as follows:

$$\sigma(x) = \frac{1}{1 + e^{-x}}$$

Wherein, x represents the input value. The Sigmoid function is commonly employed in the output layer of binary classification problems. Since it maps the input value to a range between 0 and 1, the output can be interpreted as a probability value, indicating the probability of the positive class. In gradient descent algorithms, the derivative calculation of the Sigmoid function is relatively simple, making it more efficient in computing gradients in backpropagation algorithms. In other embodiments, the multi-layer perceptron 650 can also adopt the ReLU (Rectified Linear Unit) activation function.

The parameters used in the vision transformer model 600 are as follows. The batch size is set to 32, and the maximum training epoch is set to 50. The loss function employs binary cross-entropy for binary classification problems and aims to minimize the difference between the predicted probability and the actual label. In binary classification problems, the label values are typically 0 or 1, each corresponding to a class. When the model's prediction result is consistent with the actual labels, the loss function value should approach 0. If the model's prediction result is inconsistent with the actual labels, the loss function value will increase. The binary cross-entropy loss function encourages the model to produce probability outputs close to the true labels during training and provides good gradient information during backpropagation, thereby facilitating the optimization of model parameters.

The optimizer employed in the embodiment can be Adam, a type of adaptive learning rate optimization algorithm. The Adam optimizer combines the characteristics of momentum gradient descent and adaptive learning rate adjustment, enabling it to effectively update model parameters during the training process.

The initial learning rate of the vision transformer model 600 is set to 0.0001, wherein the ReduceLROnPlateau function is employed, with a patience value of 3 and a factor of 0.2. When the validation loss fails to decrease for 3 consecutive training epochs, the learning rate may be reduced by a factor, thereby enabling the vision transformer model 600 to learn more detailed and informative features.

Furthermore, the vision transformer model 600 also employs an early stopping mechanism with a patience value of 6. During the training process, if the validation loss fails to decrease after 6 consecutive training epochs, the vision transformer model 600 may stop training to avoid unnecessary subsequent training time.

In summary, the third model 133 of the present invention is trained using the vision transformer model 600 implementation. When the inference module 138 performs diagnosis on an input image, it utilizes the trained third model 133 to determine whether atrophic gastritis and intestinal metaplasia precancerous lesions have occurred, and predicts their severity. The inference module 138 can also visualize the prediction result through heatmap overlaying, thereby facilitating the user's interpretation of the diagnosis results.

Figure 7:
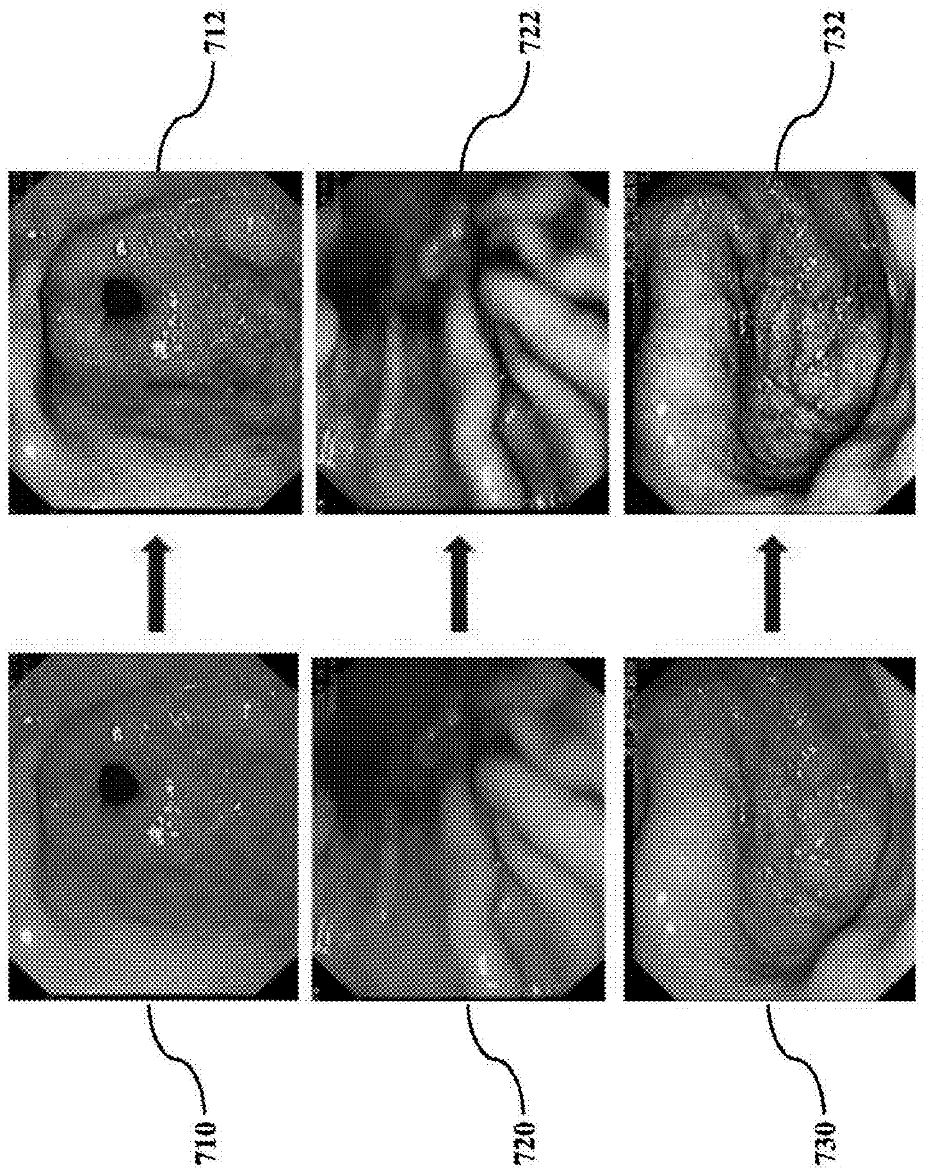
FIG. 7 shows an image enhancement result according to an embodiment of the present invention.

FIG. 7 illustrates the image enhancement results of the present invention implementation. The preprocessing module 134 performs a CLAHE operation on the input image data to enhance image details and highlight gastric mucosa features. As shown in FIG. 7, the original gastric ulcer image 710, original gastric body image 720, and original gastric antrum image 730 are processed by the preprocessing module 134 to become the enhanced gastric ulcer image 712, enhanced gastric body image 722, and enhanced gastric antrum image 732, respectively. The contrast enhancement of the images facilitates subsequent prediction operations.

Figure 8:
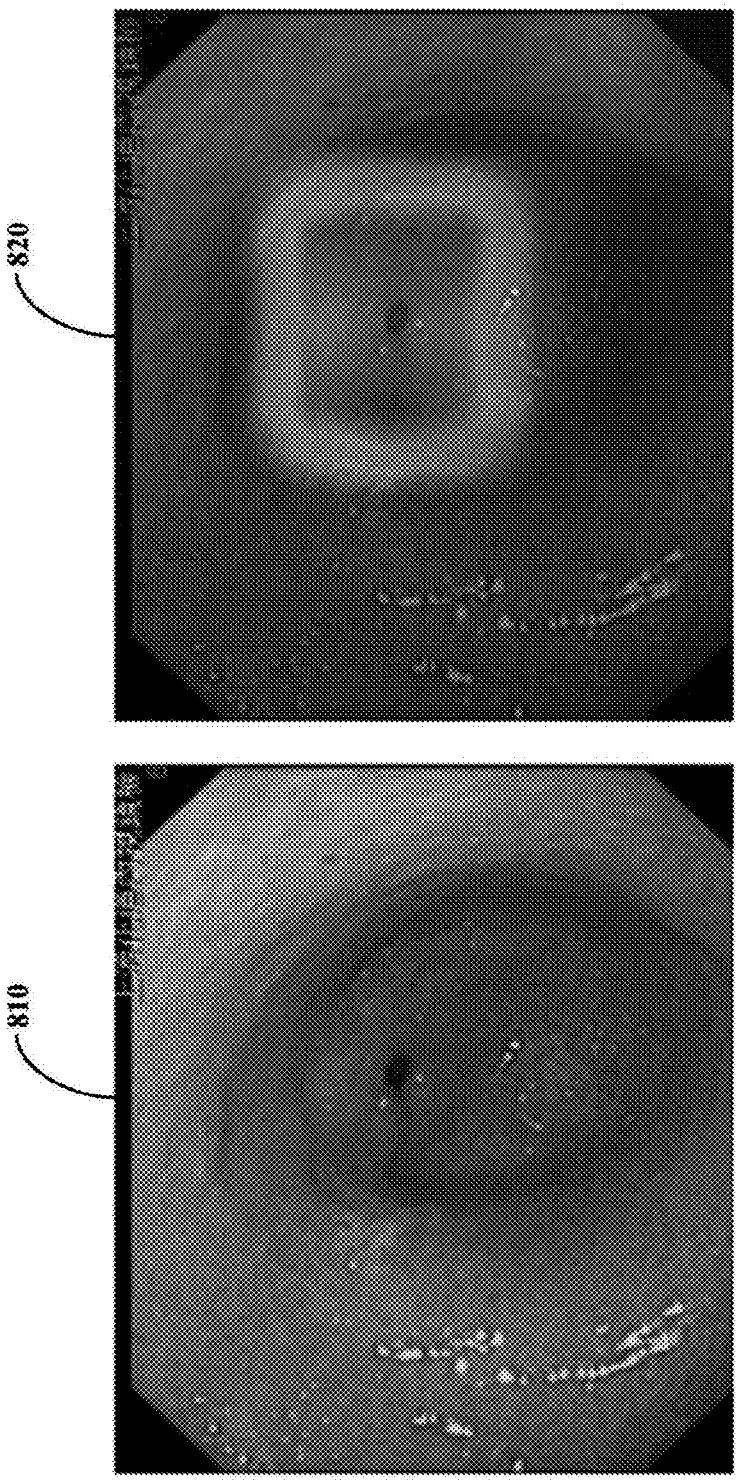
FIG. 8 shows a heatmap overlay result according to an embodiment of the present invention.

FIG. 8 illustrates the heatmap overlay results of the present invention implementation. When the inference module 138 performs prediction on the original image 810, it can utilize the Gradient-weighted Class Activation Mapping (Grad-CAM) operation to generate a heatmap. By overlaying the heatmap with the original image, the original image 810 is transformed into a heatmap overlay image 820, wherein the color bias visual effect represents the regions worthy of attention. Therefore, the heatmap overlay image 820 serves as a reference for clinical diagnosis.

The medical auxiliary diagnostic system 100 proposed by the present invention not only integrates artificial intelligence models to simulate medical judgment thinking processes but also incorporates medical data from resource-limited regions into analysis. The implementation of the present invention brings several advantages. For example, the quality of traditional endoscopic images, such as proximity and blur, can affect the step-by-step process of image classification. The implementation of the present invention provides heatmap overlay effects, which can assist endoscopic doctors in evaluating the prediction result output from the medical auxiliary diagnostic system 100. In conventional implementations, sampling angle errors of endoscopic images can affect the judgment ability of artificial intelligence systems. The present invention not only follows standardized sampling procedures but also generates normalized image data through image preprocessing programs, effectively reducing error variables. When the present invention implementation uses the third model 133 to predict precancerous gastric diseases, it also enhances mucosa image details, effectively assisting endoscopic image analysis work. Furthermore, the artificial intelligence prediction model of the present invention takes precancerous conditions into consideration when performing prediction analysis on samples. The actual execution results show that the overall disease rate has a higher negative predictive value. This indicates that the medical auxiliary diagnostic system 100 of the present invention can effectively reduce the requirement for low-risk gastric cancer patients to undergo endoscopic monitoring, thereby saving unnecessary medical costs.

It should be noted that, in this text, the terms "including", "comprising", or any other variations thereof are intended to cover non-exclusive inclusion, thereby making the process, method, article, or device that comprises a series of elements not only comprise those elements but also comprise other elements that are not explicitly listed, or are inherent to such process, method, article, or device. Without further limitation, the element defined by the phrase "including one . . . " does not exclude the presence of additional identical elements in the process, method, article, or device that comprises that element.

The above description combines the diagrams to describe the embodiments of the present invention, but the present invention is not limited to the specific embodiments described above. The specific embodiments described above are merely illustrative and not restrictive. Under the guidance of the present invention, ordinary technicians in this field can still make many variations without departing from the spirit and scope of the present invention, and all such variations fall within the claim scope of the present invention.

It should be noted that in this document, the terms "comprising", "including", or any other variants thereof are intended to encompass non-exclusive inclusion, so that a process, method, article, or device comprising a series of elements includes not only those elements but also includes other elements that are not explicitly listed, or are inherently present in the process, method, article, or device. Unless otherwise limited, the terms "including a . . . " do not exclude the presence of additional identical elements in the process, method, article, or device that includes the element specified.

The embodiments described above in conjunction with the figures are purely illustrative and not restrictive, and those skilled in the art can make many forms without departing from the spirit and scope of the present invention as disclosed herein and as protected by the claims. In accordance with the term table and previous context, the general technical personnel in this field may make many forms under the disclosure of the present invention without departing from the purpose and scope of the present invention and the scope protected by the claims.

What is claimed is:

1. A medical auxiliary diagnostic system for providing medical diagnostic auxiliary services, comprising:

a sampling system collecting and storing medical images, wherein the sampling system stores a first dataset and a second dataset;

a user device connected to the sampling system, configured to read the medical images from the sampling system or upload medical images; and an image analysis system connected to the sampling system and the user device, configured to analyze the medical images according to the user device's requirements, thereby generating auxiliary images for assisting diagnosis, wherein:

the image analysis system reads the first dataset and the second dataset from the sampling system to perform deep learning;

the image analysis system, based on the results of the deep learning, infers the analysis of a target image provided by the image analysis system, thereby generating an auxiliary diagnostic image for assisting in identifying precancerous lesions;

the first dataset comes from a non-specific region, having an average incidence rate;

the second dataset comes from a specific region, having an incidence rate higher than the average incidence rate;

the first dataset and the second dataset comprise upper gastrointestinal endoscopy images;

wherein the image analysis system comprises:

a training module performing the deep learning based on the first dataset and the second dataset;

a first model, trained by the training module, capable of identifying gastric regions and non-gastric regions in a sample image;

a second model, trained by the training module, capable of further classifying the identified gastric regions in the sample image into a stomach antrum, a stomach body, and a stomach fundus; and a third model, trained by the training module, capable of determining whether a precancerous lesion or *Helicobacter pylori* infection exists in the stomach antrum and stomach body of the sample image:

wherein the sample image is an upper gastrointestinal endoscopy image from the first dataset or the second dataset;

wherein the precancerous lesion comprises atrophic gastritis, intestinal metaplasia, and *Helicobacter pylori* infection;

wherein the third model is trained using a visual transformer as a template model, with the training module fine-tuning the parameters, and comprises:

a translation patching layer, configured to generate four shifted images by translating an input image along four diagonal lines, and then stack them with the input image to form a shifted stack image;

an image segmentation layer, coupled to the translation patching layer, which cuts the shifted stack image into multiple patches, flattens them into a one-dimensional sequence, where each patch corresponds to a fixed-length feature vector;

a positional embedding layer, coupled to the image segmentation layer, which receives the multiple patches output by the image segmentation layer and adds positional information to each patch;

a multi-layer encoder, coupled to the positional embedding layer, which performs self-attention operations between the input multiple patches to extract a feature vector matrix corresponding to the input image; and a multi-layer perceptron, coupled to the multi-layer encoder, comprising multiple fully connected layers, and configured to pool the feature vector matrix to obtain a probability distribution matrix representing the entire input image;

wherein the multi-layer encoder further performs local self-attention operations between each patch and its neighboring patches, emphasizing local relevance in the feature vector matrix; and wherein the multi-layer perceptron uses a sigmoid activation function to calculate the probability distribution matrix, where each element of the matrix represents a severity level of a pathology.

2. The medical auxiliary diagnostic system according to claim 1, wherein the image analysis system further comprises a preprocessing module, configured to preprocess an input image to generate a normalized image, wherein:

when the preprocessing module preprocesses the input image, the preprocessing module converts the input image into a grayscale image;

the preprocessing module utilizes the Otsu thresholding method to convert the grayscale image into a binary map;

the preprocessing module performs an edge detection on the binary map to identify a target region in the input image;

the preprocessing module crops the input image to obtain a cropped image that only retains the target region; and the preprocessing module resizes the cropped image to a preset dimension, generating the normalized image corresponding to the input image;

wherein, before the training module performs the deep learning on the first dataset and the second dataset, the preprocessing module is used to normalize the images in the first dataset and the second dataset.

3. The medical auxiliary diagnostic system according to claim 2, wherein when the preprocessing module preprocesses the input image, the preprocessing module is further configured to perform Contrast Limited Adaptive Histogram Equalization (CLAHE) operation on the input image to enhance image details and highlight gastric mucosa features.

4. The medical auxiliary diagnostic system according to claim 2, wherein the image analysis system further comprises:

an inference module, configured to utilize the first model, the second model, and the third model to infer the target image to determine the risk of gastric cancer, wherein:

the inference module utilizes the first model to identify the gastric regions and the non-gastric regions in the target image;

the inference module utilizes the second model to further classify the gastric regions in the target image into the stomach antrum, the stomach body, and the stomach fundus;

the inference module utilizes the third model to determine whether precancerous lesions or *Helicobacter pylori* infection exist in the stomach antrum and the stomach body of the target image; and the inference module utilizes Gradient-weighted Class Activation Mapping (Grad-CAM) operation to overlay a visual effect on the target image based on the disease probability, thereby generating the auxiliary diagnostic image;

wherein, the target image is an upper gastrointestinal endoscopy image collected and stored by the sampling system, and provided to the image analysis system through the user device for analysis by the inference module; and the inference module normalizes the target image using the preprocessing module before analyzing the target image.

5. The medical auxiliary diagnostic system according to claim 1, wherein:

the first model is trained using DenseNet201 as a template model, with the training module fine-tuning the parameters; and when the training module trains the first model, it reads the first dataset and the second dataset from the sampling system, and allocates 70% thereof as a training set, 20% as a validation set, and 10% as a testing set.

6. The medical auxiliary diagnostic system according to claim 1, wherein the second model is trained using DenseNet121 as a template model, with the training module fine-tuning the parameters, and comprises:

a feature extraction module, comprising multiple layers of convolutional neural networks, and configured to extract a feature map from the input data through convolutional operations; and a classification module, comprising one or more fully connected layers, coupled to an output end of the feature extraction module, and configured to calculate probability values of the input data belonging to the stomach fundus, the stomach antrum, or the stomach body based on the feature map generated by the feature extraction module;

wherein, when the training module trains the second model, it reads the first dataset and the second dataset from the sampling system, and allocates 80% of the first dataset as a training set, 20% as a validation set, and 10% of the second dataset as a testing set; and the classification module uses a SoftMax activation function to calculate probability values of the input data belonging to the stomach fundus, the stomach antrum, or the stomach body.

7. A method for auxiliary diagnosis of gastritis, comprising:

providing a first dataset and a second dataset, wherein the first dataset and the second dataset comprise upper gastrointestinal endoscopy images;

performing image preprocessing on the first dataset and the second dataset;

performing deep learning on the first dataset and the second dataset; and based on the results of the deep learning, inferring a target image to generate an auxiliary image for assisting in identifying whether the target image comprises a precancerous lesion;

wherein the first dataset comes from a non-specific region, having an average incidence rate;

wherein the second dataset comes from a specific region, having an incidence rate higher than the average incidence rate; and wherein the deep learning step comprises:

training a first model based on the first dataset and the second dataset to identify gastric regions and non-gastric regions in a sample image;

training a second model based on the first dataset and the second dataset to further classify the identified gastric regions in the sample image into a stomach antrum, a stomach body, and a stomach fundus; and training a third model based on the first dataset and the second dataset to determine whether a precancerous lesion exists in the stomach antrum and the stomach body of the sample image;

wherein the sample image is an upper gastrointestinal endoscopy image from the first dataset or the second dataset:

wherein the precancerous lesion comprises atrophic gastritis or intestinal metaplasia; and wherein the third model is based on a visual transformer as a template model and is trained using transfer learning, comprising:

reading an input image from an open-source dataset of colon cancer tissue slice images;

generating four shifted images by translating the input image along four diagonal lines, and then stacking them with the input image to form a shifted stack image;

segmenting the shifted stack image into multiple patches, flattening them into a one-dimensional sequence, where each patch corresponds to a fixed-length feature vector;

adding positional information to each patch;

performing self-attention operations on each patch to extract a feature vector matrix corresponding to the input image, wherein the self-attention operation comprises local self-attention, emphasizing local relevance in the feature vector matrix; and pooling the feature vector matrix to obtain a probability distribution matrix representing the entire input image;

wherein a Sigmoid activation function is used to calculate the probability distribution matrix, where each element of the matrix represents a severity level of a pathology.

8. The method for auxiliary diagnosis of gastritis according to claim 7, further comprising a preprocessing step, which comprises:

converting an input image into a grayscale image;

utilizing the Otsu thresholding method to convert the grayscale image into a binary map;

performing an edge detection on the binary map to identify a target region in the input image;

cropping the input image to obtain a cropped image that only retains the target region; and resizing the cropped image to a preset dimension, generating a normalized image corresponding to the input image;

wherein, the method for auxiliary diagnosis of gastritis further comprises, before performing the deep learning step on the first dataset and the second dataset, normalizing the images in the first dataset and the second dataset through the preprocessing step.

9. The method for auxiliary diagnosis of gastritis according to claim 8, wherein the preprocessing step further comprises:

performing Contrast Limited Adaptive Histogram Equalization (CLAHE) operation on the input image to enhance image details and highlight gastric mucosa features.

10. The method for auxiliary diagnosis of gastritis according to claim 8, further comprising:

normalizing the target image through the preprocessing step;

utilizing the first model to identify the gastric regions and the non-gastric regions in the target image;

utilizing the second model to further classify the identified gastric regions in the target image into the stomach antrum, the stomach body, and the stomach fundus;

utilizing the third model to determine whether a precancerous lesion or *Helicobacter pylori* infection exists in the stomach antrum and the stomach body of the target image; and utilizing Gradient-weighted Class Activation Mapping (Grad-CAM) operation to overlay a visual effect on the target image based on the disease probability, thereby generating an auxiliary diagnostic image.

11. The method for auxiliary diagnosis of gastritis according to claim 7, wherein the step of training the first model comprises:

allocating 70% of the first dataset and the second dataset as a training set, 20% as a validation set, and 10% as a testing set; and using DenseNet201 as a template model, inputting the training set, the validation set, and the testing set into a convolutional neural network operation and fine-tuning the parameters to generate the first model.

12. The method for auxiliary diagnosis of gastritis according to claim 7, wherein the step of training the second model comprises:

allocating 80% of the first dataset as a training set, 20% as a validation set, and 10% of the second dataset as a training set; and using DenseNet121 as a template model, inputting the training set, the validation set, and the testing set into a convolutional neural network operation and fine-tuning the parameters to generate the second model, wherein:

the second model comprises a SoftMax activation function, used to calculate the probability distribution of the recognition results of the sample image.

* * * * *